United States Patent
Weast et al.

(10) Patent No.: US 12,187,315 B2
(45) Date of Patent: Jan. 7, 2025

(54) SAFE AND SCALABLE MODEL FOR CULTURALLY SENSITIVE DRIVING BY AUTOMATED VEHICLES

(71) Applicant: Mobileye Vision Technologies Ltd., Jerusalem (IL)

(72) Inventors: John Weast, Portland, OR (US); Ignacio J. Alvarez, Portland, OR (US); Maria Soledad Elli, Hillsboro, OR (US); Tal Serphos, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 788 days.

(21) Appl. No.: 17/123,826

(22) Filed: Dec. 16, 2020

(65) Prior Publication Data

US 2021/0101619 A1    Apr. 8, 2021

(51) Int. Cl.
*B60W 60/00*      (2020.01)
*G06F 16/2457*    (2019.01)
*G06N 3/08*       (2023.01)

(52) U.S. Cl.
CPC ..... *B60W 60/0015* (2020.02); *G06F 16/2457* (2019.01); *G06N 3/08* (2013.01); *B60W 2554/4046* (2020.02); *B60W 2556/10* (2020.02); *B60W 2556/45* (2020.02)

(58) Field of Classification Search
CPC ......... B60W 60/0015; B60W 2556/10; B60W 2556/45; B60W 2554/4046; B60W 2556/55; G06F 16/2457; G06N 3/08
USPC ........................................ 701/23, 25, 26, 28
See application file for complete search history.

(56) References Cited

U.S. PATENT DOCUMENTS

| | | | |
|---|---|---|---|
| 9,255,805 B1 * | 2/2016 | Ferguson | G01S 17/875 |
| 10,625,748 B1 * | 4/2020 | Dong | B60W 30/0956 |
| 10,730,531 B1 * | 8/2020 | Phillips | G08G 1/166 |
| 11,537,134 B1 * | 12/2022 | Wiest | G06N 3/0455 |
| 11,820,403 B2 * | 11/2023 | Sindhuja | G06V 20/54 |
| 11,858,536 B1 * | 1/2024 | Liu | B60W 60/0011 |
| 2013/0181823 A1 * | 7/2013 | Stahlin | G08G 1/162 340/436 |

(Continued)

OTHER PUBLICATIONS

Rosbach, S. et al., "Driving with Style: Inverse Reinforcement Learning in General-Purpose Planning for Automated Driving," [Online]. Available: https://arxiv.org/pdf/1905.00229.pdf, 2019 IEEE.

(Continued)

*Primary Examiner* — Manglesh M Patel
(74) *Attorney, Agent, or Firm* — Banner & Witcoff Ltd.

(57) ABSTRACT

A system is described to derive local driving behaviors from naturalistic data, which are then incorporated as guidance into the behavioral layer of an Automated Vehicle (AV) for adaptation to local traffic. Moreover, the local driving behaviors are implemented in the AV performance validation process. The techniques facilitate scaling of this process via automatic crowdsourced behavioral data aggregation from human-driven vehicles, as well as ADAS vehicles and autonomous vehicles, and map information. The described techniques also enable the creation of a spatial-behavioral relational database that provides interfaces for efficiently querying geo-bounded local driving information, enabling customization of automated vehicle driving policies to local norms, and enabling traffic behavior analysis.

24 Claims, 16 Drawing Sheets

(56) References Cited

U.S. PATENT DOCUMENTS

| | | | |
|---|---|---|---|
| 2015/0314783 A1* | 11/2015 | Nespolo | B60W 30/0953 |
| | | | 701/301 |
| 2017/0178352 A1* | 6/2017 | Harmsen | G05D 1/106 |
| 2018/0233047 A1* | 8/2018 | Mandeville-Clarke | |
| | | | G01S 13/931 |
| 2018/0251134 A1* | 9/2018 | Grewe | B60W 10/184 |
| 2018/0336421 A1* | 11/2018 | Huang | G06V 20/56 |
| 2019/0236083 A1* | 8/2019 | Tahara | G06F 3/0482 |
| 2019/0279111 A1* | 9/2019 | Merrill | G06N 20/20 |
| 2020/0042656 A1* | 2/2020 | Zapolsky | G06V 20/10 |
| 2020/0050191 A1* | 2/2020 | Kwon | G05D 1/0246 |
| 2020/0133281 A1* | 4/2020 | Gomez Gutierrez | |
| | | | G05D 1/0214 |
| 2020/0143183 A1* | 5/2020 | Ambeck-Madsen | G06V 10/82 |
| 2020/0151611 A1* | 5/2020 | McGavran | G06N 20/20 |
| 2020/0250473 A1* | 8/2020 | Elluswamy | G06V 20/588 |
| 2020/0293041 A1* | 9/2020 | Palanisamy | G06N 3/045 |
| 2020/0379471 A1* | 12/2020 | Abendroth | G06N 3/045 |
| 2020/0385008 A1* | 12/2020 | Terechko | G05D 1/0088 |
| 2020/0409374 A1* | 12/2020 | Dong | G06V 10/758 |
| 2021/0004012 A1* | 1/2021 | Marchetti-Bowick | |
| | | | G05D 1/0221 |
| 2021/0009121 A1* | 1/2021 | Oboril | B60W 60/0015 |
| 2021/0027628 A1* | 1/2021 | Pfadler | G05D 1/0246 |
| 2021/0080961 A1* | 3/2021 | Shenai | G05D 1/0088 |
| 2021/0089055 A1* | 3/2021 | Tran | B64U 10/30 |
| 2021/0286925 A1* | 9/2021 | Wyrwas | G06V 20/56 |
| 2021/0347383 A1* | 11/2021 | Siebert | G01C 21/3407 |
| 2022/0080982 A1* | 3/2022 | Barth | G01C 21/3815 |
| 2022/0111870 A1* | 4/2022 | Srivastava | G08G 1/162 |
| 2022/0121550 A1* | 4/2022 | Walther | G06F 30/20 |
| 2022/0126864 A1* | 4/2022 | Moustafa | B60W 30/182 |
| 2022/0161830 A1* | 5/2022 | Devassy | B60W 50/0097 |
| 2023/0064267 A1* | 3/2023 | Krutsch | G08G 1/096838 |
| 2023/0080540 A1* | 3/2023 | Unger | G06F 30/27 |
| | | | 356/5.01 |
| 2023/0084924 A1* | 3/2023 | White | G01C 21/3815 |
| | | | 701/23 |
| 2023/0085147 A1* | 3/2023 | Melnikov | G06V 20/10 |
| | | | 701/26 |
| 2023/0219597 A1* | 7/2023 | Cohen | B60W 60/001 |
| | | | 701/23 |
| 2023/0294716 A1* | 9/2023 | Tian | B60W 60/001 |
| | | | 701/27 |

OTHER PUBLICATIONS

Huang, W. et al., "Learning to Drive via Apprenticeship Learning and Deep Reinforcement Learning," [Online]. Available: https://arxiv.org/pdf/2001.03864.pdf. [3] [Online]. Available: https://arxiv.org/pdf/2001.03864.pdf. Jan. 12, 2020.

Vincent, J., Twitter taught Microsoft's AI chatbot to be a racist asshole in less than a day, "The Verge," Mar. 24, 2016, [Online]. Available: https://www.theverge.com/2016/3/24/11297050/tay-microsoft-chatbot-racist.

"Autonomous Vehicles—Negotiating a Place on the Road," [Online]. Available: http://www.lse.ac.uk/website-archive/newsAndMedia/PDF/AVs-negociating-a-place-on-the-road1110.pdf. Copyright 2016.

Shalev-Shwartz et al., "On a Formal Model of Safe and Scalable Self-driving Cars", Mobileye, 2017 "Responsibility Sensitive Safety," [Online]. Available: https://arxiv.org/pdf/1708.06374.pdf.

Mobileye, "REM," [Online]. Available: (https://www.mobileye.com/our-technology/rem/). Copyright 2020.

Paden, B. et al., "A Survey of Motion Planning and Control Techniques for Self-driving Urban Vehicles," [Online]. Available: https://arxiv.org/pdf/1604.07446.pdf, 2016.

Bender, P. et al., Lanelets: Efficient map representation for autonomous driving, 2014 IEEE Intelligent Vehicles Symposium Proceedings (pp. 420-425) IEEE. (Jun. 2014).

Hochreiter, S., et al., "Long short-term memory" Neural computation 9(8) (1997): 1735-1780.

Kingma, Diederik P. et al., "Adam: A method for stochastic optimization." arXiv preprint arXiv:1412.6980 (2014)—Published as a conference paper at ICLR 2015.

Vires Simulation Technologies, OpenDrive Format Specification (2019) Retrieved online from http://www.opendrive.org/docs/OpenDRIVEFormatSpecRev1.5M.pdf.

Merler, S. et al., Parallelizing AdaBoost by weights dynamics, Computational statistics & data analysis, 51(5), (2007) 2487-2498.

Wiki.openstreetmap.org/wiki/elements—date of last revision Nov. 3, 2020.

The OpenStreetMap data model, found at: https://labs.mapbox.com/mapping/osm-data-model/; 2020.

Cattoor, B. et al., figures INFRASTRUCTURES: An atlas of Roads and Railways, Article Jan. 2012.

* cited by examiner

100

150

1200

SAFE AND SCALABLE MODEL FOR CULTURALLY SENSITIVE DRIVING BY AUTOMATED VEHICLES

TECHNICAL FIELD

Aspects described herein generally relate techniques implementing behavioral modeling to apply culturally sensitive behavioral tuning to driving policies implemented by autonomous vehicles (AVs).

BACKGROUND

Driving safely is cultural. For example, human drivers in New York drive differently than human drivers in Iowa. Aside from safety, a main challenge for the widespread deployment of Automated Vehicles (AV's) is cultural acceptance. Popular opinion is strongly against the deployment of AVs, and a significant factor in that reluctance is a concern that AVs drive like brainless robots as opposed to local human drivers. In other words, the ability to scale AVs globally is critically related to the ability of AVs to adapt their driving behavior in a way that is considered culturally acceptable in the area in which the AV is operating.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1A:
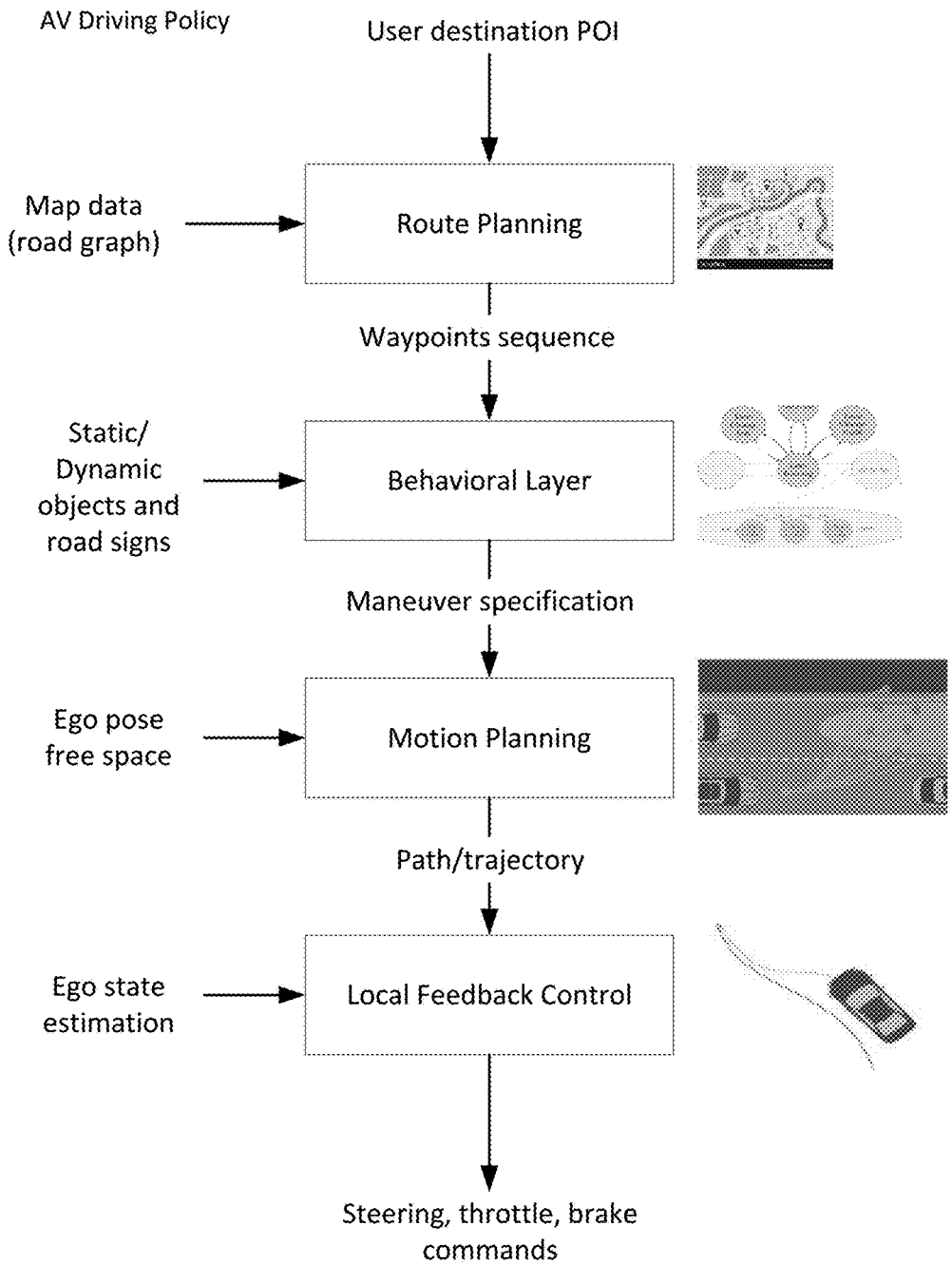
FIGS. 1A and 1B illustrate two state of the art approaches for creating behavioral models.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Again, current AV systems have failed to adequately mirror human behavior in a manner that reflects local driving behaviors across different regions and cultures. Depending on the approach employed in the development of the AV decision logic, adaptations to cultural norms can vary from difficult (for parametric/rule-based systems) to almost impossible (in the case of data-learned dependencies) due to the exponential nature of hyper-parameter tuning. This is unsurprising, as even for human drivers adapting their driving style when travelling is challenging, as their own judgement must discern (and interiorize) what other drivers do and what is considered "normal."

Different local driving styles also impact the conditions under which AVs operate, introducing different safety challenges in each geolocation. Modeling the differences in driver behaviors between different regions can also lead to a simpler analysis of system failure rates and more accurate predictions of geo-specific performance levels. Conventional attempts to achieve this include localized testing and fine tuning. Such approaches perform test/trial deployments, during which AV developers make first hand observations about the response of human drivers (as well as vulnerable road users) to the AV, and then make manual adjustments to the driving policy algorithms to mimic human driver behavior to better fit in with human drivers on the roads in that specific area in which they are testing.

However, such localized testing and fine tuning techniques are not scalable, as understanding the differences in various locations can only occur after practical deployment. Thus, localized testing and fine tuning cannot perform efficient planning for "simpler" deployment locations. For instance, assume that after 2 years an AV that has been tested on the road is now sufficiently optimized to fit in with human drivers and drive like everyone else in a specific area. To deploy the AV anywhere else (or at least anywhere else with sufficiently different driving behavior) the training process must be repeated, with the same expensive AV test fleet, and with all of the same time-consuming modifications. And even if the process could be optimized and take only 6 months instead of 2 years, this still requires pre-deployment of the AV to a new area along with safety drivers and engineers to manually learn the new driving style of people in the new area, who may not drive the same as people in the previous area.

Another conventional attempt to perform regional AV model training includes the use of machine learning techniques such as Reinforcement Learning (RL), in which reward functions are specified, a goal to learn is determined, and/or the behavior of the AV is dynamically adjusted to match the local behavior patterns, with the idea that in doing so the AV will learn to how to drive like a local based on observed behavior. However, this process involves training using large amounts of observations, which usually needs to be repeated when locations exhibit different behavioral distributions, when behaviors are not existent in the original training dataset, or when contextual cues (e.g. signs, road markings, etc.) are significantly different than in the original dataset.

Moreover, RL based approaches for learning from humans are notoriously problematic. On one hand, RL needs interaction with the environment to learn a policy for a particular case (i.e. a geographical region), and therefore, interaction with a representative set of real human drivers is needed. Moreover, interaction with the "real world" may also present its own dangers if a baseline driving policy is different from real human driver, which may lead to causing accidents to occur before the driving policy 'learns' enough to do better. In some cases, simulation can help in this aspect by adding Human-in-the-loop simulation into the RL training pipeline, in which the policy is learned via human interaction (learning by demonstration). This approach is also referred as "off-policy" RL. However, these approaches suffer from the same problems as mentioned before, i.e. the policy has to be trained by a representative portion of the population from each geolocation where the AV will be deployed.

On the other hand, when the policy continues to be updated with each interaction with the environment, namely on-policy RL, the problem now becomes that the policy learning cannot be done in a controlled manner and, therefore, the "teachers" (i.e. interactions with the environment) simply cannot be trusted at all times. The problem with on-policy RL approaches is with respect to a trust that the "teachers" will be altruistic and will not try to game the system. When human drivers know they are dealing with an AV (which likely they will due to special license plates or visual identifiers), people may try to game the AV for maximum advantage: cutting off the AV much more than they would a normal human driver, stepping in-front of the AV as a vulnerable road user much more than a vulnerable road user ever would if it were a human driven car, etc.

Thus, none of the current approaches have been sufficient to enable widespread global scalability of AVs without significant cost and expense. Therefore, to address these issues, the aspects described herein utilize techniques to derive local driving behaviors from naturalistic data, which are then incorporated as guidance into the behavioral layer of an AV for adaptation to local traffic. Moreover, the local driving behaviors are implemented into the AV performance validation process. Furthermore, techniques are disclosed for scaling this process via automatic crowdsourced behavioral data aggregation from human-driven vehicles and map information. Still further, the creation of a spatial-behavioral relational database is disclosed that provides interfaces for efficiently querying geo-bounded local driving information, enabling customization of automated vehicle driving policies to local norms, and enabling traffic behavior analysis.

To do so, and as further discussed below, the aspects described herein extract behavioral characteristics in a defined area (e.g. geo-fenced, roadway type, etc.) and combine the behavioral characteristics with the safety guarantees of a safety behavioral model (also known as a safety driving model or SDM), providing the observed behavioral characteristics as input to the driving policy to apply culturally-sensitive behavioral tuning without violating safety guarantees.

In accordance with the aspects further described herein, the behavioral modeling may be achieved by a variety of methods. One such method is by leveraging crowdsourced data, such as the data gathered by many (e.g. millions) of human driven vehicles on the road today. Another method is to leverage telematics information obtained by insurance companies or other providers who precisely monitor the driving style of their drivers. With such methods, a model may be trained offline without risk of malicious intent, and to understand what the acceleration, braking, steering, and other temporal-related characteristics that define a pattern of "normal" driving in a certain location, or even more precisely a specific road type or segment in a specific location.

By using the resulting driving style model (using geographical or road type segmentation) inputs can be provided into the behavioral layer of an AV's particular driving policy, so that the AV will be able to take input (in the form of constraints or suggestions) in such a way that the resulting motion planning will resemble a local driver from the moment it hits the road—even without any actual "driving experience" of the AV in that location. Thus, the aspects described herein, which may model driving behavior from crowdsourced data, enable pre-deployment evaluation of system performance in different locations as well as a geo-specific definition of comfort driving. The aspects described herein thus promote rapid deployment by identifying the safest locations to deploy and drive in those locations in a locally defined manner from the initial deployment of the AVs.

Figure 1B:
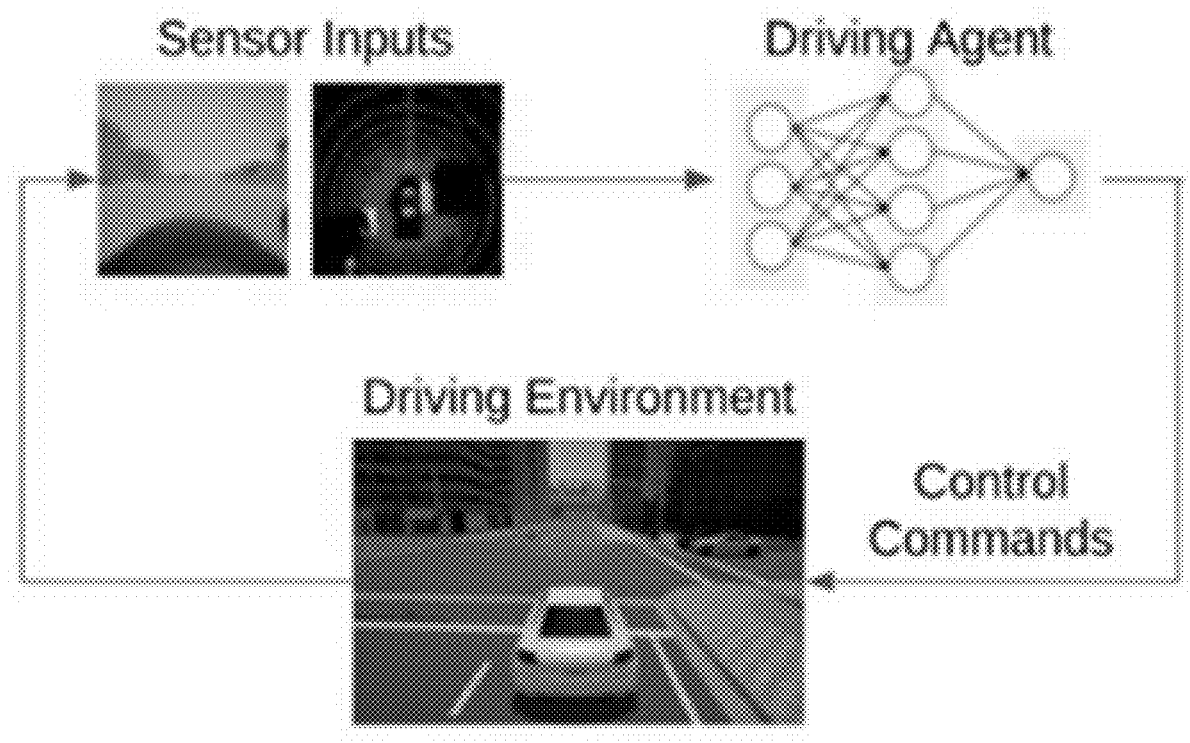

FIGS. 1A and 1B illustrate two state of the art approaches for creating behavioral models. In the approach shown in FIG. 1A, a behavioral model is created using a hierarchically-structured AV system approach with route planning, behavioral decision making, local motion planning, and feedback control submodules. In the approach shown in FIG. 1B, a behavioral model is created using an end-to-end (E2E) approach, in which all or some of the previous modules are hidden as latent representations in a complex neural network construct.

In the hierarchically-structured AV system approach as shown in FIG. 1A, after a route plan has been found specifying a sequence of selected road segments, the behavioral layer is then responsible for selecting the appropriate driving behaviors at any point in time based on the perceived behaviors of other traffic participants, road conditions, and possible signals from infrastructure. Driving behaviors may include everything from the rate of acceleration, slope of the braking profile, aggressiveness of lateral movements, use of the horn, turning signals, etc. The challenge of specifying how an AV should behave has been traditionally solved using finite state machines coupled with different heuristics to encompass driving rules and safety concerns. However, driving conditions, especially those in urban scenarios, are characterized by a large number of interactions with road agents (vehicles, vulnerable road users, etc.) whose behavior cannot be predicted without uncertainties. The uncertainties in the behavior of other road agents is usually considered at the behavioral layer using probabilistic planning formalisms such as Markov decision processes or partially observable Markov decision processes (POMDP).

For the E2E approach as shown in FIG. 1B, on the other hand, the driving decision logic is abstracted under a single neural network construct trained from raw or processed sensor input and labeled expert control data. For example, a network may be trained using camera inputs and conditioned on high-level commands to output steering and acceleration, thus enabling an E2E network to follow route-like guidance (e.g. turn right/left). Solutions include the use of a Generative Adversarial Imitation Learning (GAIL) approach for optimization of a policy overcoming some cascading errors to produce stable trajectories over long time horizons. Learning methods to produce behavioral models require large amounts of training data, which is easy to create in synthetic (simulated) driving environments such as Car Learning to Act (CARLA), but these usually have performance issues when applied to real driving environments. This problem is known as the "domain transfer challenge."

Other E2E approaches solve this issue by abstracting the network from raw sensor data and feeding abstracted information to cope with the lack of realism in simulators of both sensor and vehicle dynamics. A similar approach includes presenting the network with a synthesized environment (e.g. a world model representation), which is trained via imitation from expert driving. Perturbations to the expert input are then injected to augment the driving policy with loss leanings from resulting bad behaviors.

This previous work shows that it is possible to learn flexible (and potentially generalizable) behavioral models from data. However, learning behavioral driving models from real world data at scale remains an issue despite these advances. Current research is focused on developing generalizable, universal safe driving policies that can perform safely and efficiently in multiple domain. But common sense suggests that there is no such thing as a "universal" driver that behaves like a "local" anywhere in the world. As a result, such approaches are limiting, and ultimately require significant local customization and tuning, limiting the speed and scale of deployment.

The aspects described herein propose a scalable method to determine behavioral characteristics in a geofenced area from crowdsourced observations in combination with the safety guarantees of a safety behavioral model such as a safety driving model (SDM). As used herein, an SDM may include any suitable type of model that facilitates, guides, or otherwise defines a manner in which an AV may operate in a particular environment and under a particular set of conditions, such as the use of safety restrictions under which the AV operates within an environment, for example. For instance, an SDM may include an open and transparent mathematical model that functions as a set of objectives to be followed to ensure autonomous vehicle safety, which has been developed to address safety considerations for autonomous vehicles. The SDM thus represents guidelines to be followed that mimic basic principles humans follow when driving, such as defining dangerous situations, the cause of dangerous situations, and how to respond to them. SDMs define specific parameters and techniques with respect to safety considerations or safety restrictions to be universally followed for AVs in an attempt to standardize their behavior. For example, a SDM may include a definition of acceptable safe or minimum distances that, when met, allows an AV to safely merge into flowing traffic. As another example, the SDM may define a safe distance for an AV to maintain behind another vehicle.

Figure 2:
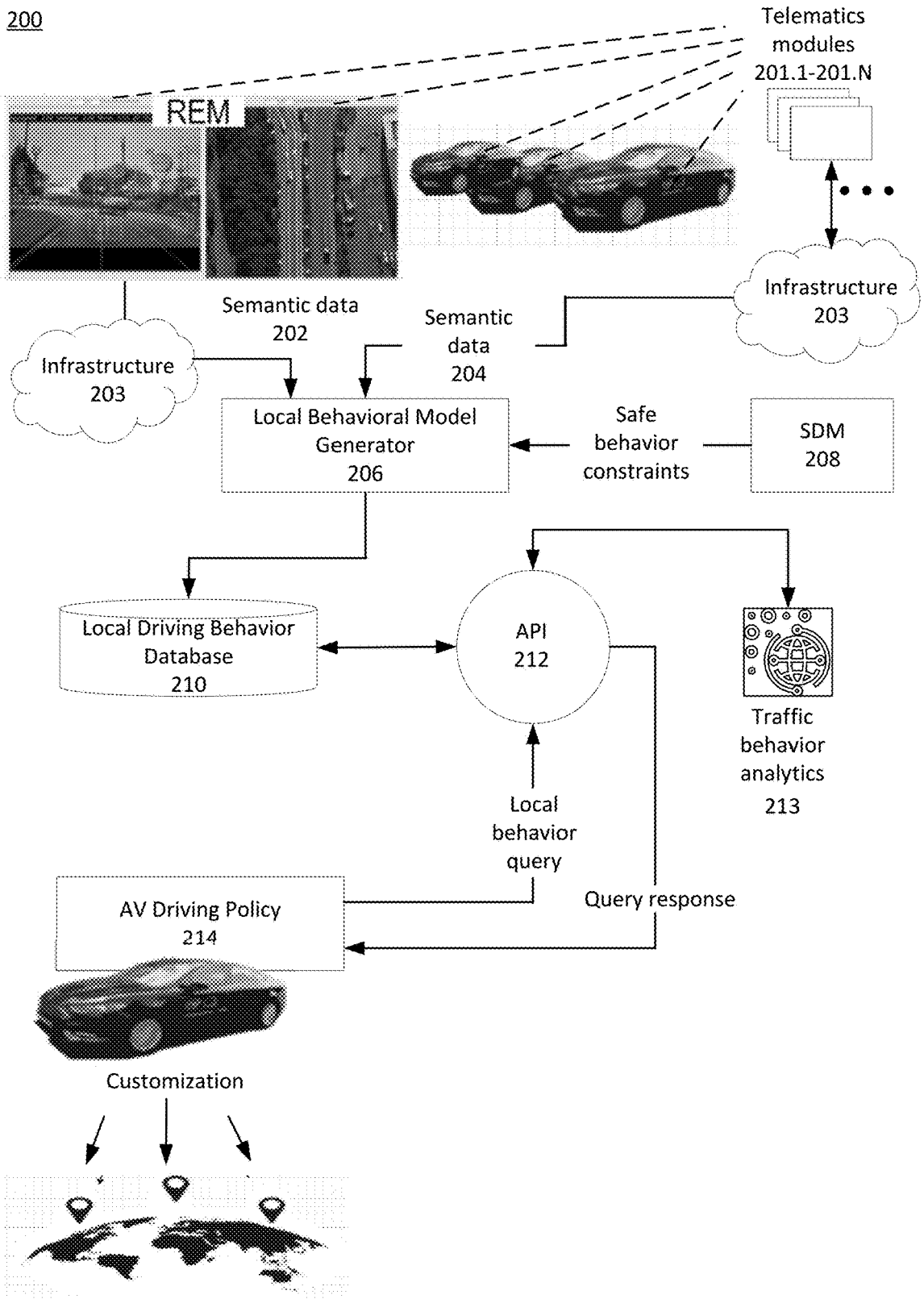
FIG. 2 illustrates an example overview of local behavioral modeling system, in accordance with one or more aspects of the present disclosure.

FIG. 2 illustrates an example overview of a local behavioral modeling system, in accordance with one or more aspects of the present disclosure. The local behavioral modeling system 200 as shown in FIG. 2 includes the aggregation of static semantic data, which may be associated with static or stationary landmarks and may be associated with a location, road scene, or any suitable environment to be navigated (e.g. map data, lane boundaries, traffic signs, etc.) as well as dynamic semantic data, which may include temporally sequential semantic data from dynamic (e.g. moving, mobile, or movement-capable) road actors (e.g. vehicles, trucks, vulnerable road users, etc.). The local behavioral model generation 206 is performed via classification of dynamic data in distinct driving maneuvers in the road segments (or map tiles), as further discussed herein. Trained behavioral models are then curated using the SDM 208 as constraints on the training data to ensure that unsafe behaviors are not learned. The behavioral models are then organized in a database structure in the local driving behavior database 210. An application programming interface (API) 212 may be utilized by a deployed vehicle as discussed in further detail below, to perform queries on the local parameters associated with the behavioral models stored in the local driving behavior database 210, which may be defined in accordance with a current road segment or other suitable geolocation. Additionally or alternatively, other computing devices such as those identified with third parties, state and local municipalities, etc., may likewise perform queries on the local parameters associated with the behavioral models stored in the local driving behavior database 210 to obtain traffic behavior analytics, as further discussed herein.

The details of local behavioral modeling system 200 shown in FIG. 2 will be further discussed herein. However, in general, the aspects include using specific types of data to provide inputs into the behavioral layer of an AV's Driving Policy 214 via the API 212, so that the AV is able to take input (e.g. in the form of constraints or suggestions) in such a way that the resulting motion planning will resemble a local driver from the moment it hits the road. For instance, the data used as inputs may represent geo-bounded data associated with a particular location(s) such as a road, intersection, region, etc., and may optionally further include data identified with various driving styles for different times of day (e.g. rush-hour vs. the weekend, day vs. night, etc.), that coincide at the respective locations. In an example implementation, this solution can behave like a semantic layer on a high-definition map used by the vehicle during the driving task to receive relevant behavior information.

To do so, aspects include the local behavioral modeling system implementing feedback provided by any suitable number N of driver telematics modules 201.1-201.N, which may be installed in various vehicles and/or road infrastructure sources in various geolocations. These vehicles may include, for instance, human-driven vehicles, whereas the road infrastructure sources may include, for instance, road signs and/or other suitable types of "smart" infrastructures that may report static-based metrics. The telematics modules 201.1-201.N may, for example, be implemented as a component that is integrated in a vehicle and/or road infrastructure source, or a component (e.g. a mobile device) that may be located within a vehicle or otherwise identified with a vehicle and configured to monitor, generate, and transmit various metrics indicative of each vehicle's driving style/behavior. Alternatively, and as noted above, the source of the dynamic semantic information may include other sources such as leverage telematics information obtained by insurance companies or other providers who precisely monitor the driving style of their drivers.

Examples of such metrics may include, for instance, driving metrics reported by vehicles and/or static metrics reported by road infrastructure sources, including acceleration metrics such as an acceleration profile (i.e. slope of acceleration curve), braking metrics such as a braking profile (i.e. slope of braking curve), steering metrics such as a steering profile (i.e. slope of steering curve when changing lanes), lane position, throttle pedal angle, brake pedal angle, average distances between an ego vehicle and other agents in different road types for all observable agents (i.e. highway, urban roads, intersections, etc.). Additionally or alternatively, the telematics modules 201.1-201.N may support the receipt of data and/or other wireless transmissions, such as updating the vehicle's behavioral model, software updates, etc. Thus, the telematics modules 201.1-201.N may be implemented as any suitable type of processing circuitry, hardware and/or software components to implement this functionality, including using known techniques to do so. In various aspects, the telematics modules 201.1-201.N may correspond to any suitable type of device that may be installed as part of any suitable type of vehicle (e.g. human-driven, AV, ADAS, etc.). Additionally or alternatively, the telematics modules 201.1-201.N may form part of an existing ADAS and/or AV driving system that is configured to make observations and collect data with respect to driving behavior, locations, objects at various locations, road types, etc.

In various aspects, the local behavioral modeling system 200 also includes a network infrastructure 203, which functions as an interface between the telematics modules 201.1-201.N to provide the dynamic semantic data to the local behavioral model generator 206, as well as the static semantic data, which may be provided via the telematics units 201.1-201.N or other suitable sources as discussed herein. The semantic data 202, 204 may include any suitable combination of dynamic data and static data, which may be provided by any combination of different types of infrastructure 203, telematics modules 201, etc., in various aspects. In an aspect, the network infrastructure 203 may be implemented as a cloud-based crowdsource aggregation infrastructure, but the aspects described herein are not limited to this implementation and any suitable type of infrastructure and/or interface may be implemented for this purpose. For example, the network infrastructure 203 may be implemented as any suitable configuration of wireless access points, base stations, or other communication networks that enable receipt of the semantic data 202, 204, as well as forwarding, processing, formatting, and/or transmitting the data associated with the semantic data 202, 204 to the local behavioral model generator 206.

Thus, in various aspects, the network infrastructure 203 facilitates collecting, at scale, the driver telematics information from any vehicle equipped with one of the telematics modules 201.1-201.N. Although a small number of vehicles and telematics modules 201.1-201.N are shown in FIG. 2, aspects include the number of vehicles and corresponding telematics units 201 being several million or more, which may be referred to herein as a vehicle "fleet" providing various metrics for this purpose. For instance, the telematics modules 201.1-201.N may be implemented by vehicles implementing advance driver-assistance system (ADAS) technology and/or AVs all over the world, and may form part of a fleet of vehicles that may implement the SDM 208 or other various types of suitable driving models. As an additional example, when implemented as part of an AV or ADAS-equipped vehicle, the telematics modules 201.1-201.N may be implemented as part of or the entirety of such an existing AV or ADAS system identified or otherwise used by such a vehicle. This may include, for instance, the ADAS and/or AV systems themselves and/or any components, sensors, etc. associated with such systems (e.g. cameras, light detection and ranging (lidar(s)), radio detection and ranging (radar(s)), ultrasonic sensors, processing systems, communication systems, etc.

In an aspect, the local behavioral modeling system 200 also includes a local behavioral model generator 206, which is configured to generate a driving behavior model representing driving behavior. The local behavioral model generator 206 may be configured as one or more processors, hardware, and/or software components, and form part of any suitable type of infrastructure or platform that receives the semantic data 202, 204, which is then processed to output a local behavioral model that is stored in the local driving behavior database 210. For example, the local behavioral model generator 206, local driving behavior database 210, and API 212 may be implemented as processing circuitry and/or software associated with one or more server computers, a data center, or other suitable processing devices that may operate as part of the network infrastructure 203, as separate processing components that communicate with the network infrastructure 203 (e.g. cloud-based servers and/or computers), or a separate network infrastructure not shown in the Figures. In other aspects, the local behavioral model generator 206, local driving behavior database 210, and API 212 may be implemented locally by an AV or other suitable type of vehicle, such as an electronic control unit (ECU) or other suitable processing components. Additionally, aspects include any combination of the local behavioral model generator 206, local driving behavior database 210, and API 212 being implemented locally as part of an AV or other suitable vehicle and as cloud-based or remote implementations.

Aspects include the local behavioral model generator 206 generating the local behavioral model implementing the safe behavior constraints provided by the SDM 208. Again, the SDM 208 represents guidelines to be followed that mimic basic principles humans follow when driving, such as defining dangerous situations, the cause of dangerous situations, and how to respond to them. The local behavioral model generated via the local behavioral model generator 206 is also a mathematical representation with respect to the physical characteristics that describe the way human driven vehicles behave. Thus, the local model generator 206 may record deviations from a global behavioral standard and communicate the deviations when such a deviation occurs and for driving behavior that deviates from the global behavioral standard. Thresholds and tolerances may be established and implemented to streamline any updates (and communication bandwidth as well as other resources required for such updates). For example, the level of accuracy of measurements may be reflected in the thresholds to avoid making updates that are a result of measurement accuracy constraints.

For instance, the local behavioral model may identify, using the semantic data 202, 204, metrics such as how fast vehicles accelerate after a green light, how long vehicles wait at full stop before proceeding at a stop sign, how many seconds to change lanes, how aggressively vehicles brake, and how much distance are typically provided to other drivers or other non-vehicle actors such as vulnerable road users, for example, which may include pedestrians, cyclists, or any other suitable non-vehicle actors that may be vulnerable to actions taken by road vehicles.

Each of these factors make up a driving "personality" that is represented by the local behavioral model, which is most often culturally relevant due to cultural and environmental cues. The aspects described herein generate the local behavioral model to provide a driving style model that describe what it means to drive like a local but having the constraints and characteristics defined by the SDM 208. In other words, the SDM defines parameters that determine the boundaries of safety with respect to an objectively safe standard. A local driving style may be ultimately reflected by the generation of the behavioral model operating within guidelines that are bound by the safe behavior constraints identified by the SDM 208 (e.g. how fast a vehicle accelerates, brakes, steers, takes corners, etc.). In various aspects, this mathematical model of the local behavioral model can be constructed in different ways. For instance, aspects include generating the local behavioral model using a list of parameters (e.g. jerk, throttle pedal angle, etc.), finite state machines coupled with different heuristics to encompass driving rules and safety concerns, or probabilistic planning formalisms such as Markov decision processes.

In an aspect, the local behavioral modeling system 200 also includes a local behavior database 210, which may be implemented as any suitable type of storage device that stores models having a particular structure that is based on geo-spatial and maneuvering relationships, as further discussed herein. For example, the local behavior database 210 may host or otherwise store existing models and their relationships in a space-graph database containing spatial and maneuver relationships, which is further discussed in detail below. To do so, the local behavior database 210 may include any suitable number and type of communication interfaces to receive the local behavioral models generated via the local behavioral model generator 206 as well as supporting data communications with the API 212. In an aspect, once the behavioral models are generated and stored in the local driving behavior database 210, the API 212 may be implemented to enable querying from traffic behavior analytics 213. For instance, the traffic behavior analytics 213 may represent a third party or a state or local government that requests information regarding specific driving metrics for a specific region. The aspects described herein facilitate such queries of the local driving behavior database 210 via the API 212.

For example, and as further discussed below, the aspects described herein may support the storage of data in the local driving behavior database 210 to support the query and extraction of any suitable type of data that may be useful to various government authorities, municipalities, etc. In particular, because the local driving behavior database 210 may store data in accordance with various regional levels, this may be particularly useful for different municipalities in accordance with a desired region and granularity. For instance, behavioral queries may be performed at multiple scale levels (e.g. road segment, local area, municipality, city, county, state, country, etc.). As an example, a state government may desire to obtain information related to driving behavior along intrastate highways, whereas a smaller town may desire information regarding cyclist behavior. As yet another example, a larger city may desire information related to abnormal driving behavior at certain points/locations within the city such as intersections, which may lead to a root cause of such behavior such as poor infrastructure, traffic light cycles that are too short, inadequate signage, etc. In an aspect, the node link structure described herein, which may be used for the local driving behavior database 210, provides a meta-geographical model that enables behavioral queries at multiple scale levels (e.g. road segment, local area, municipality, city, county, state, country, etc.) to provide such information.

In an aspect, the local behavioral modeling system 200 also includes, for each vehicle implementing the local behavioral models, a querying interface configured to facilitate agents using the local behavior database 210 for location-based parameter extraction or geo-bounded analytics. The querying interface is illustrated in FIG. 2 between the AV driving policy block 214, which is implemented via a particular AV using communications in accordance with the API 212, which thus functions to enable querying of the local behavior database 210 and, via the API 212, also enables queries for any suitable parameters associated with the driving behavioral models or the behavioral models themselves such as driving style parameters, traffic agent prediction, and traffic behavior analytics, for instance. The API 212 may be implemented in accordance with any suitable number and/or type communication protocols, data communication interfaces, etc., which may include known APIs and/or API structures. For example, the AV driving policy block 214 may be implemented by one or more local AV components (e.g. one or more electronic control unit(s) ECU(s)), which are used by each AV to perform autonomous navigation functions using a local behavioral model. In this way, an AV may use the API 212 to query for one or more local driving style parameters that are then incorporated into its own behavioral layer. Doing so results in a motion planning task that will mimic driving like a local.

Figure 3:
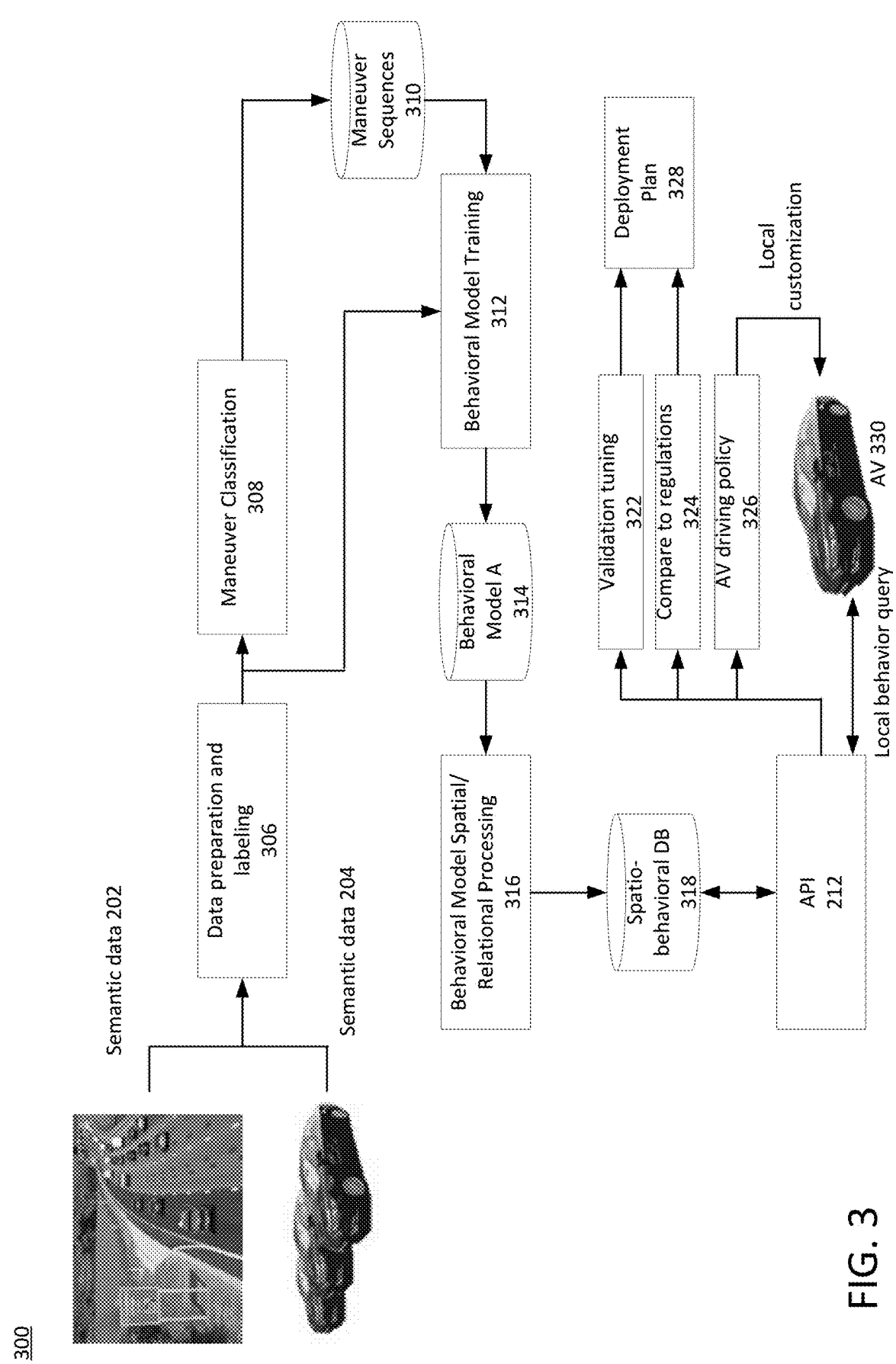
FIG. 3 illustrates additional details of an example local behavioral modeling system, in accordance with one or more aspects of the present disclosure.

FIG. 3 illustrates an example local behavioral modeling system, in accordance with one or more aspects of the present disclosure. The local behavioral modeling system 300 as shown in FIG. 3 demonstrates a flow diagram from raw data capture to model creation, and provides additional detail with respect to the local behavioral modeling system 200 and the generation of the local behavioral model as discussed with reference to FIG. 2. In an aspect, once a local behavioral model of a driving style for a particular location has been created, the local behavioral model can then be distributed using the same crowd-sourcing infrastructure to gather the data, and the vehicles can deploy the driving style "on the fly," without the need for a major software update.

The local behavioral modeling system 300 as shown in FIG. 3 provides additional details with respect to the behavioral model generation in two stages, which includes data preparation and model training. The local behavioral modeling system 300 as shown in FIG. 3 includes several processes that are similar or identical to those discussed above with respect to the local behavioral modeling system 200 as shown in FIG. 2. Therefore, the details associated with these processed will not be repeated for purposes of brevity. As discussed above with respect to FIG. 2, the local behavioral modeling system 300 may include various stages, or blocks, which perform the functions as described herein. This may be implemented, for instance, via any suitable type of processing circuitry associated with one or more server computers or other suitable processing devices that may operate as part of the underlying infrastructure, or as remote and/or separate processing components that communicate with the infrastructure (e.g. cloud-based servers and/or computers). In an aspect, the local behavioral modeling system 300 includes the collection of semantic data 202, 204 via an appropriate infrastructure (not shown in FIG. 3), as discussed above with reference to FIG. 2. The stages, or blocks, 306, 308, 310, 312, 314, and 316, however, provide additional detail with respect to the manner of operation of the local behavioral model generator 206 as shown in FIG. 2.

Figure 4:
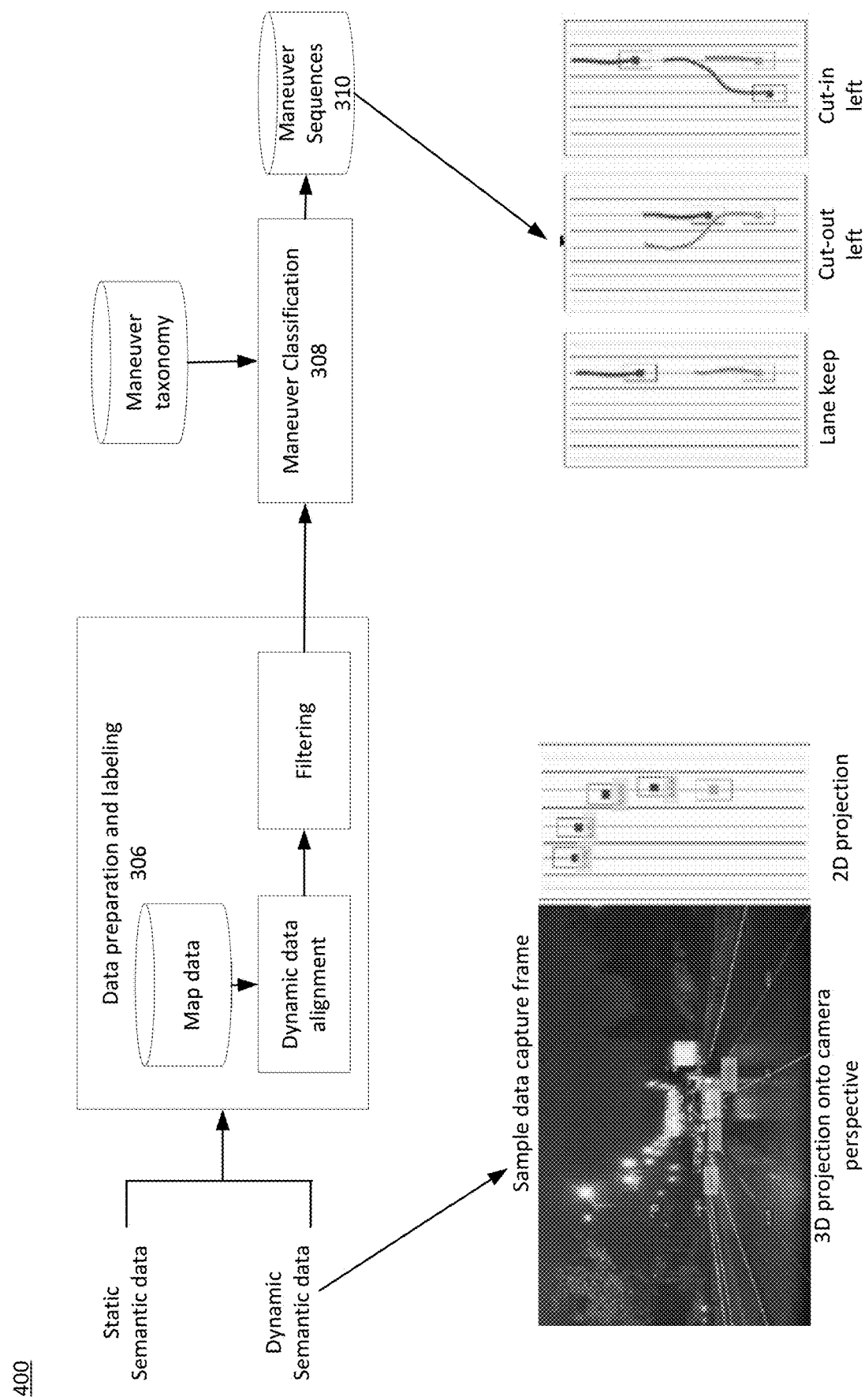
FIG. 4 illustrates an example maneuver sequence process used as part of a local behavioral modeling system, in accordance with one or more aspects of the present disclosure.

More specifically, the first stage includes preparing and labeling the received semantic data 202, 204, which may include static semantic data and dynamic semantic data, as part of the data preparation and labeling stage 306. This may include, for instance, identifying or classifying specific types of driving and/or static metrics as discussed herein, which determines if and how specific components of the collected metrics are to be used as part of the behavioral model. This process is depicted with additional detail in FIG. 4, which illustrates a maneuver sequence process in accordance with one or more aspects of the present disclosure. As an illustrative example, the data preparation and labeling stage 306 may aggregate the static semantic data and dynamic semantic data, which may include road actor labeled data crowdsourced from the vehicle fleet or other sources, e.g. via the telematics modules 201.1-201.N. This processing may include, for instance, localization, alignment to map tiles and lanes, as well as filtering for model training, as shown in FIG. 4.

Next, in the maneuver classification stage 308, the prepared and labeled data is used to divide sequential object tracks into distinct driving maneuver segments in each determined map tile. For example, maneuver classification may be performed on sequential data recordings in which a maneuver label from the maneuver taxonomy database as shown in FIG. 4 is matched (e.g. lane-keeping, car-following, cut-out, cut-in, turn-left, etc.) depending on the position of the ego vehicle and other surrounding vehicles from an initial timestamp to the end time of the sequence. Thus, as shown in FIG. 4, aspects include crowdsourcing dynamic actor data (e.g. dynamic semantic information) from road agents, which is then aligned to lanes, filtered, and classified and stored per maneuver in the maneuver sequences database 310.

Figure 5A:
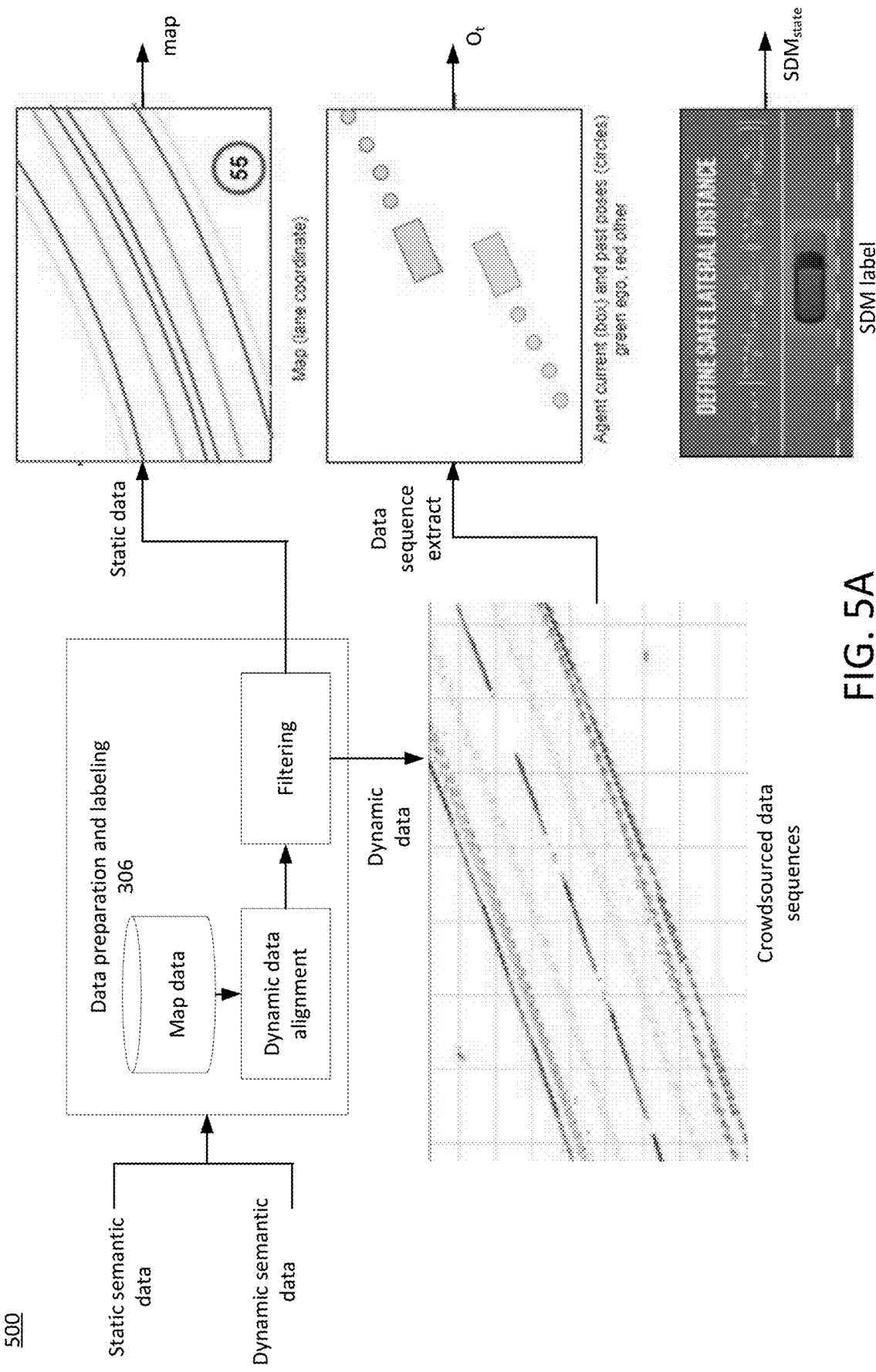
FIGS. 5A-5B illustrate an example behavioral model input/output diagram, in accordance with one or more aspects of the present disclosure.
Figure 5B:
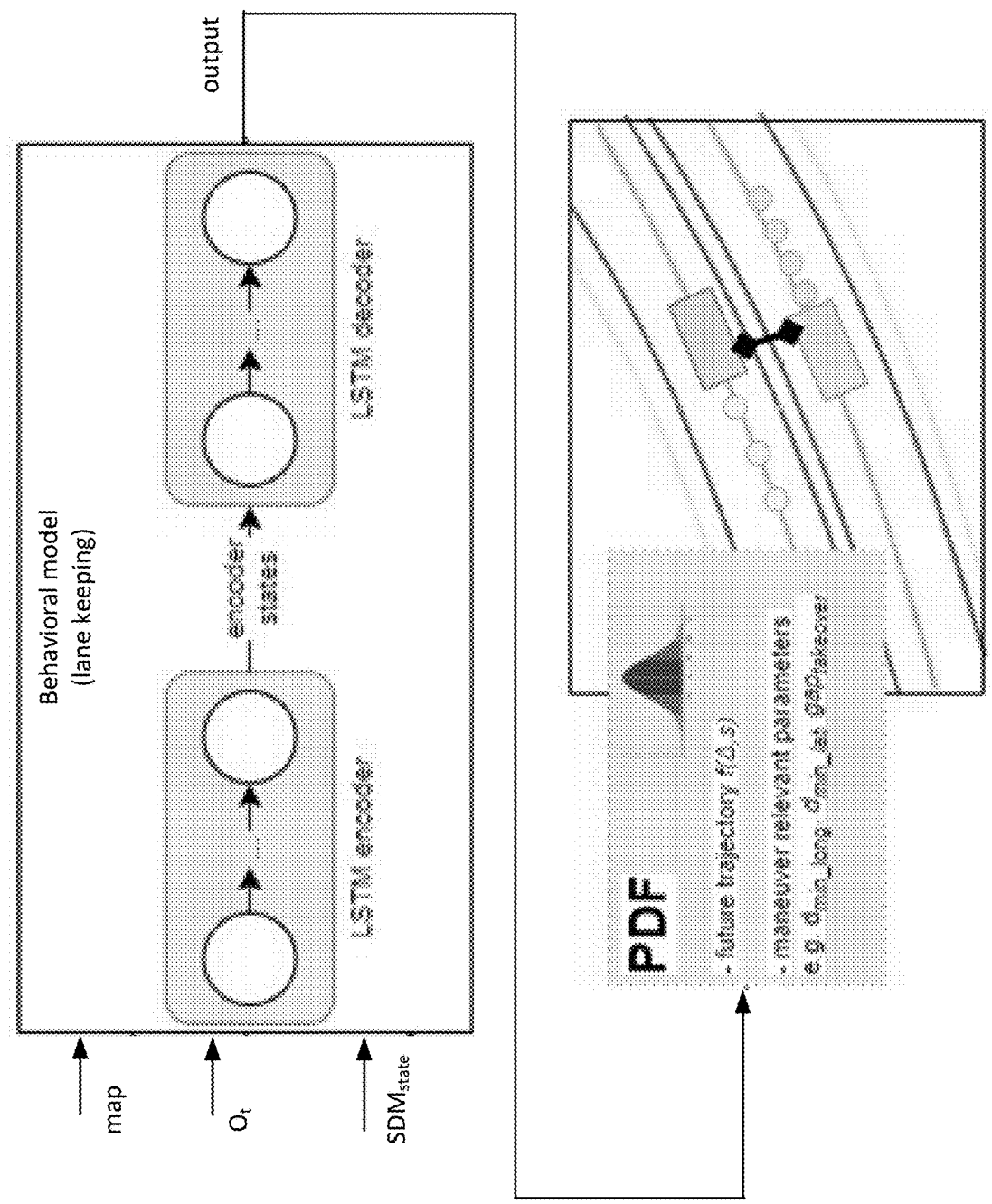

Referring back to FIG. 3, once the maneuvering sequences are stored in the maneuver sequences database 310, aspects include training the behavioral model in the behavioral model training stage 312 in accordance with a particular maneuvering sequence. The details associated with this training phase are further shown in FIGS. 5A-5B. For example, the data preparation and labeling stage 306 outputs static data from filtered static semantic data and dynamic data from filtered dynamic semantic data as shown in FIG. 5A. Thus, the model receives the static scene information from the map as shown in FIGS. 5A-5B, which includes lane geometry descriptions, identifiers, lane hierarchy representations, etc.

Moreover, the filtered dynamic data is sequentially extracted to provide a sequence of data sequences over some period of time that is relevant to a particular static map location. For example, the filtering may be based upon other vehicles previously located at the same map tile, road segment, etc., which have performed a similar or identical maneuver or are involved as part of a similar or identical maneuver. In other words, aspects include, during the training phase, the model receiving as input metrics associated with the previously-extracted maneuvers, with the ego vehicle and a number 'n' of other maneuver-related vehicles in a temporally-sequential manner including historic delta observations, which may be represented as $O_t=\{\{\{e_{pose}, \Delta_{pose}\}, \{v_{pose}^1, \Delta v_{pose}^1\}, \ldots \{v_{pose}^n, \Delta v_{pose}^n\}\}$, as shown in FIGS. 5A-5B. For instance, in the notation described above, $e_{pose}$ may represent a position of the ego vehicle, $\Delta_{pose}$ may represent the difference (delta) from the prior temporal position of the ego vehicle, $v_{pose}^1$ may represent the velocity of another vehicle, $\Delta v_{pose}^1$ may represent a velocity differential with respect to the ego vehicle, and so on.

In addition, the behavioral model receives with each input an SDM label $SDM_{state}$ for the current state as training feedback to limit the output behaviors to safe observed behaviors as defined by SDM safety formulas. As shown in further detail in FIG. 5B, the behavioral model is trained or otherwise generated for a lane keeping maneuver is composed, in this example, of two Long-term Short-term Memory neural networks (LSTM), which may function in accordance with known LSTM neural networks, for example. The inputs described herein to generate the behavioral models are provided by way of example and not limitation, and any suitable type of data may be used based upon the particular type of driving behavior that is to be defined at particular locations and/or under other various driving contexts such as the time of day, the day or the week, during different types of weather, etc. Thus, the behavioral models may be generated using any set of suitable data such that queries may be made in accordance with the types of input used, as further discussed herein.

The use of LSTM neural networks is provided by way of example and not limitation, and aspects include the use of any suitable type of machine learning techniques and/or architectures. Moreover, although the models are referred to as being trained throughout the disclosure, this is for ease of explanation and used by way of example and not limitation. The aspects described herein may implement any suitable type of behavioral model construct including those that may be trained as well as any other suitable types of behavioral models, which do not necessarily need to be trained but may instead use sets of constraints applied to their inputs to generate the desired output data. For example, the aspects described herein may implement rule-based models, regression models, support vector machines, state machines petri nets, etc., which may (but do not necessarily require) learning from training data sets.

However, the use of LSTM over traditional RNNs, hidden Markov models, and other sequence learning methods may be particularly advantageous as LTSMs are less sensitive to temporal delay length, and thus can process and predict time series given time lags of unknown duration and for data of various size and density. This enables the trained behavioral model to be highly flexible on the duration of delta history needed for the output predictions and also the future time that the behavioral model can predict trajectories. In an aspect, and as shown in in FIG. 5B, the behavioral model outputs the predicted trajectory of the ego agent, given in the form of a probability density function with the likelihood of positions of ego vehicle $e_{pred}^t$ ($x_t$, $y_t$) i for the future f time points $t=\{t_{c+1}, \ldots, t_{c+f}\}$ predicted from the maneuver-learned position posterior. In an aspect, for each maneuver, the output may also be additionally or alternatively accompanied with characteristic parameters such as longitudinal and lateral minimum distances or minimum gap (to initiate cut-out maneuver), or other suitable parameters as defined by the SDM.

In an aspect, for training the LSTM behavioral model, the following mean squared error (MSE) loss function is implemented in accordance with Equation 1 below as follows:

$$L = \frac{1}{f*N} \sum_{t=tc+1}^{tc+f} \sum_{i=1}^{N} SDM_{state}^t \|(e_{pred}^t - e_{true}^t)\|2 \quad \text{Eqn. 1}$$

where $t=\{t_{c+1}, t_{c+2}, \ldots, t_{c+f}\}$ is a time point in the future, $e^t_{pred}$ the predicted coordinate for the ego vehicle at time t, and $e^t_{true}$ is the ground truth. $SD_{state}{}^t \in [0,1]$ is a weighted "discount" for dangerous states as measured by the SDM. In an aspect, the LSTM behavioral model is then trained using a stochastic gradient descent optimizer. This training process is repeated for each of the existing maneuver sequence observations in a particular road segment (e.g. a map tile), which corresponds to the static data. For instance, referring back to FIG. 3, the example behavioral model discussed with respect to FIGS. 5A-5B may correspond to a lane keeping model, which is labeled as "behavioral model 'A'" at block 314 in FIG. 3. Thus, in this example, the behavioral model A enables the prediction of lane keeping maneuvers for other vehicles at the same location in the future and, because the behavioral model is linked to the geolocation in accordance with the static map data, this trained behavioral model facilitates other vehicles doing so in a manner that mirrors other drivers at that same location. The behavioral training model process described herein may be repeated for any suitable number of different maneuvers and locations to generate a set of trained behavioral models covering a particular geographic region of any suitable size and/or shape. With continued reference to FIG. 3, aspects include storing the generated behavioral models in an integrated manner in the spatio-behavioral database 318 by applying behavioral model spatial/relational processing at block 316, which enables geo-bounded querying as further discussed herein.

As shown in FIG. 3, the spatio-behavioral database 318 stores the behavioral models and accompanying parameters, which have a spatial relationship structure that is established via data processing at block 316. For example, the output of the maneuver behavioral models described with reference to FIGS. 5A-5B, which are stored in the behavioral model database 314, may function as a starting point for the creation of a spatio-behavioral model database 318 that aggregates the locally-learned behavioral models in a relational structure. Thus, each of the behavioral model database 314 and the spatio-behavioral database 318 may be identified with the local driving behavior database 210 as shown and described with reference to FIG. 2. Although FIG. 2 illustrates a single database for storing both the locally-learned behavioral models (e.g. stored in database 314) and the spatio-behavioral structure of the locally-learned behavioral models (e.g. stored in database 318), this is for brevity and ease of explanation, and the aspects described herein may store the locally-learned behavioral models and the spatio-behavioral structure of the locally-learned behavioral models in the same storage location or separate locations, in various aspects.

The AV driving policy 326 may thus be identified with the AV driving policy block 214 as shown in FIG. 2. The AV driving policy block 326 may include an AV driving policy, which is evaluated via the validation tuning block 322 against a specific set of metrics (i.e. safety benchmark) before or during deployment of the AV policy in a target environment (e.g. in a specific country or region). Moreover, the compare to regulations block 324 may represent the process through which the outcome of a local behavior query is evaluated against existing rules of the road, which may comprise of a number of legal traffic rules applicable in a geo-fenced driving area. The deployment plan block 328 may thus represent the specification of where (geographically) the AV vehicles are to drive in order to be tested, collect extra data, operate commercially (which includes the previous validation tuning), checks of performance against regulation, other fleet management considerations, etc.

Figure 6:
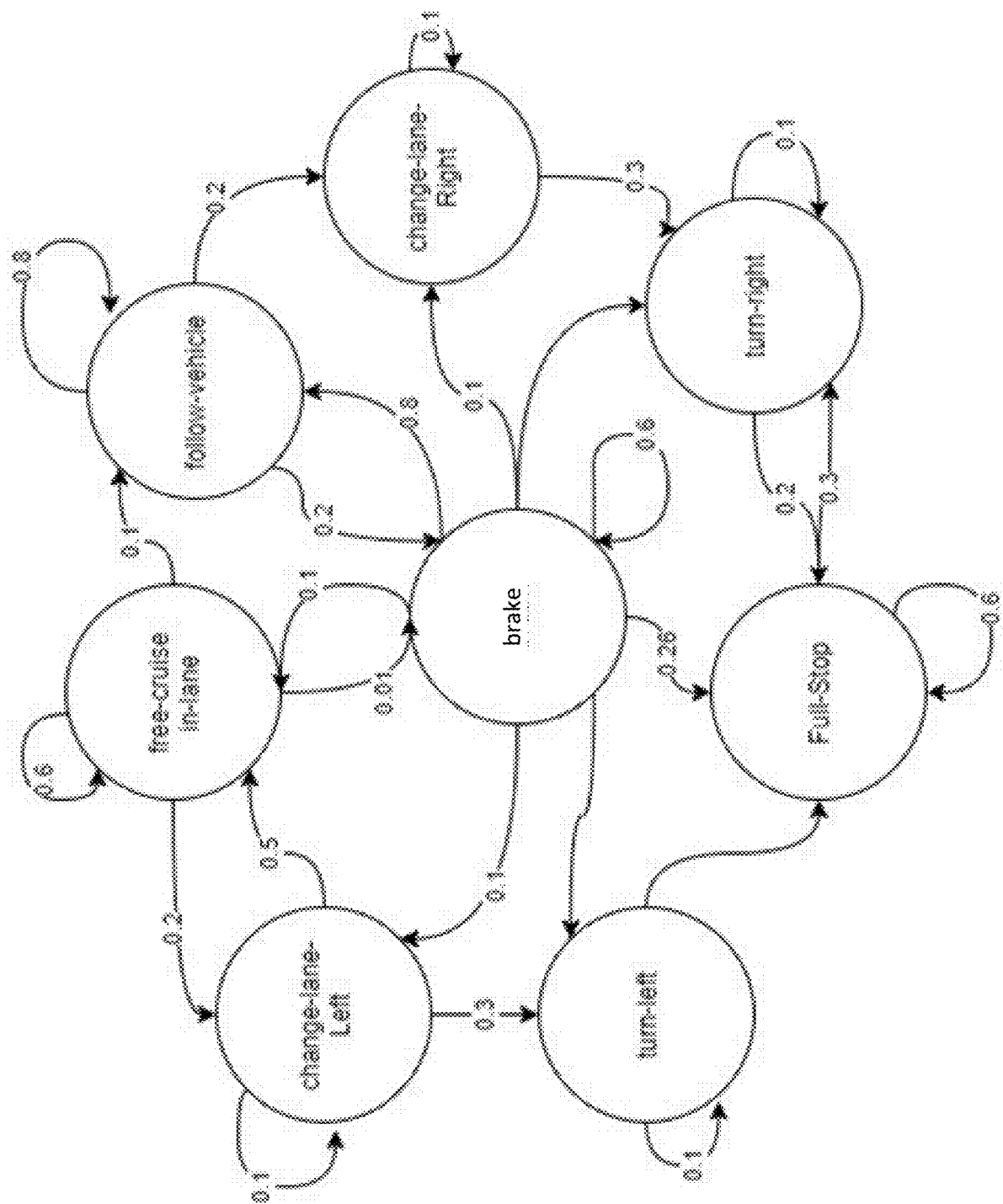
FIG. 6 illustrates an example maneuver taxonomy state diagram, in accordance with one or more aspects of the present disclosure.

In any event, aspects include using at least two types of relational attributes to store the behavioral models within the spatio-behavioral database 318. The examples provided herein are by way of example and not limitation, and aspects include any suitable relational attributes being used for this purpose. As an example, the first relational attribute includes the relation that one maneuver has with other maneuvers at a particular geolocation. An example taxonomy of maneuver types and transition probabilities is represented in FIG. 6, in which behavioral models are represented as nodes, and the likelihood of one maneuver transitioning into another maneuver at time t+1 is represented in links (or edges) connecting the various nodes, with the value in each respective link representing a normalized likelihood. Of course, not all road segments or road tiles will enable all maneuvers. Thus, given a complete maneuver taxonomy, only a subset of links may exist and have probabilities higher than 0 based on the crowdsourced naturalistic data.

Figure 7:
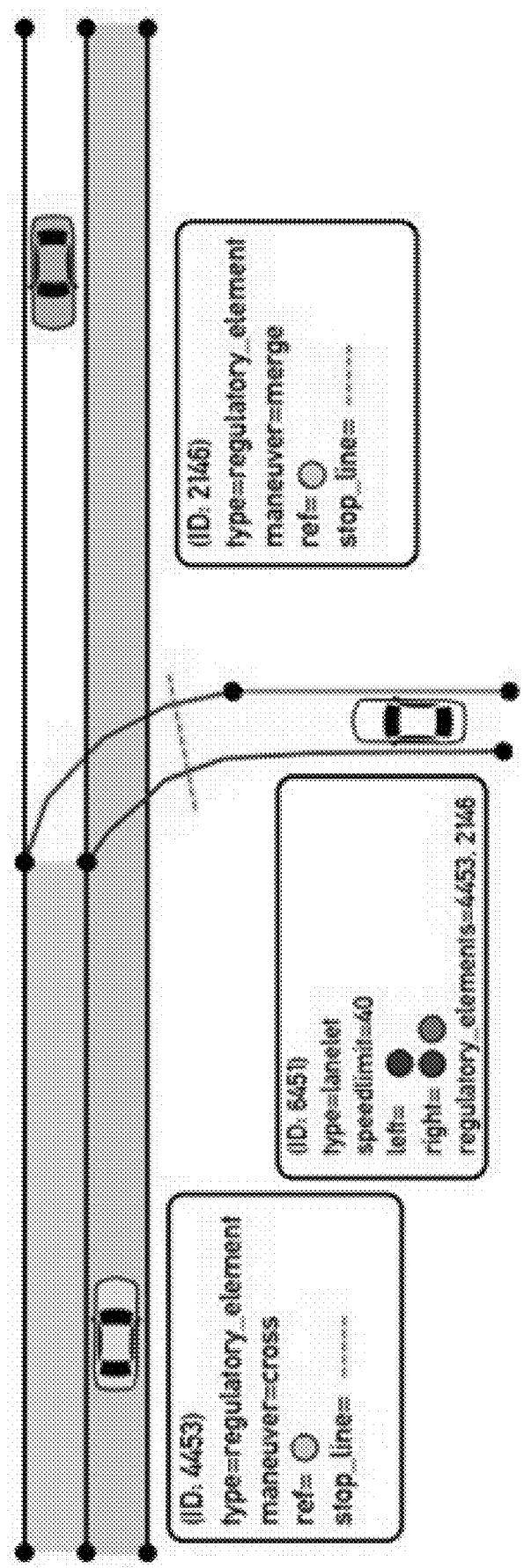
FIG. 7 illustrates an example of Lanelet elements in a map with attributes including regulatory elements and allowed maneuvers, in accordance with one or more aspects of the present disclosure.

Continuing this example, the second of the relational attributes of importance is expressed by spatial location. For instance, each of the behavioral models may be linked to a particular road segment, and road segments may be linked to each other based on the road topology. This concept is applied in existing map data structures. For example, OpenStreetMap models the environment with topological maps using nodes, ways, and relations, in which ways denote lists of nodes (polylines), and relations consist of specified node roles or properties. The same idea is implemented in other map formats used for autonomous driving. For example, and with reference to FIG. 7, "lanelets" express road segments using a graph of adjacent polylines, which also include other information such as regulatory speed limits or allowed maneuver types as node attributes.

In an aspect, the behavioral model spatial/relational processing block 316 processes the generated behavioral models at scale, which are then stored in the spatio-behavioral database 318. To do so, aspects include the behavioral model spatial/relational processing block 316 using two types of nodes to establish a graph-based database structure and relationship among the various behavioral road models. For instance, the behavioral model spatial/relational processing block 316 may establish road nodes that represent map descriptors such as polylines, which have relationship links to similar nodes by means of adjacencies and position, and may contain road attributes such as the above regulatory elements, directionality, priority of the lane, etc. The behavioral model spatial/relational processing block 316 may also establish behavioral nodes that contain links to the road nodes (locations) in which the respective training data was collected, as well as links to other behavioral nodes with values as maneuver transition probabilities.

Figure 8A:
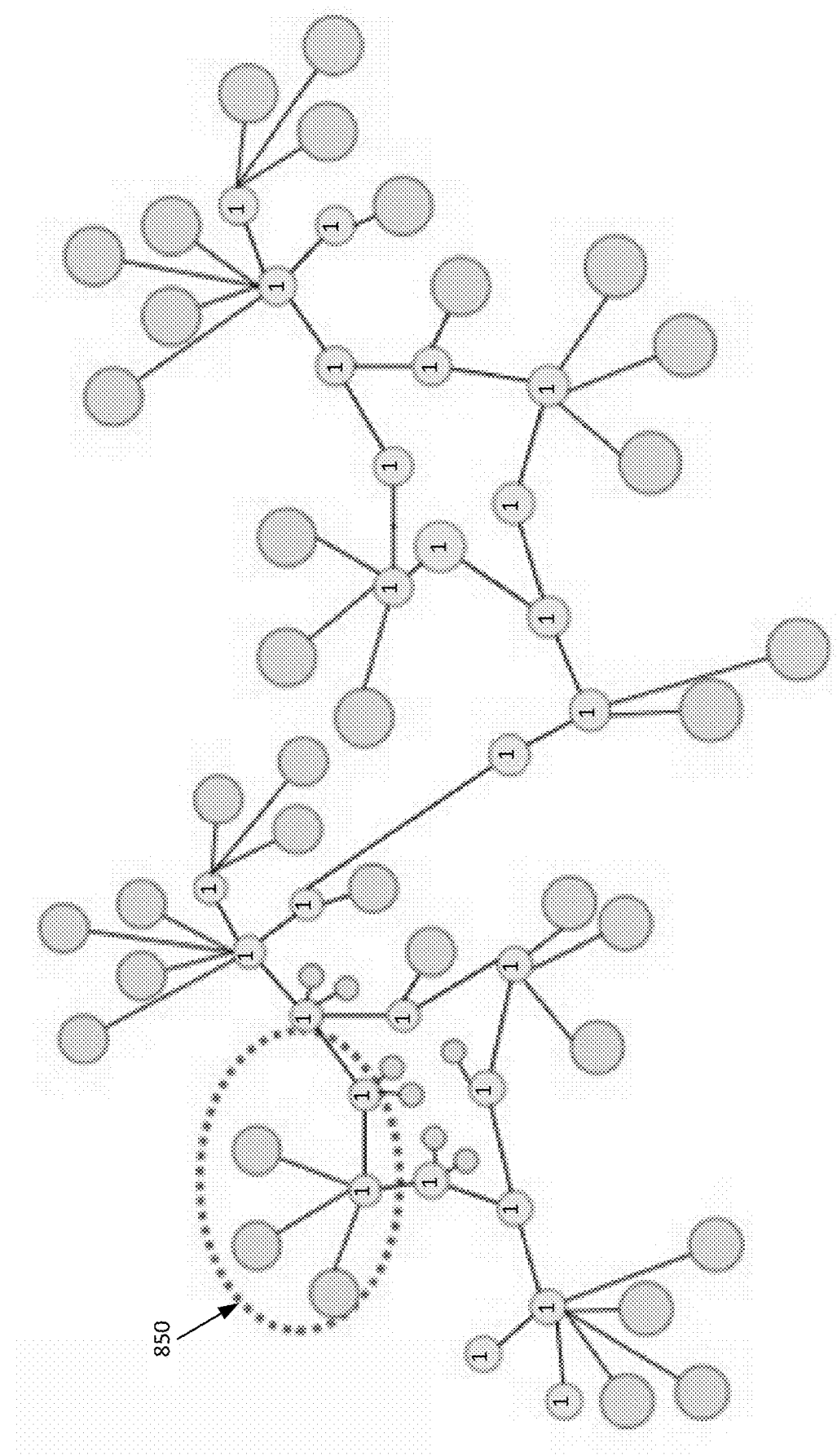
FIGS. 8A and 8B illustrate an example visual representation of an example behavioral model graph dataset, in accordance with one or more aspects of the present disclosure.
Figure 8B:
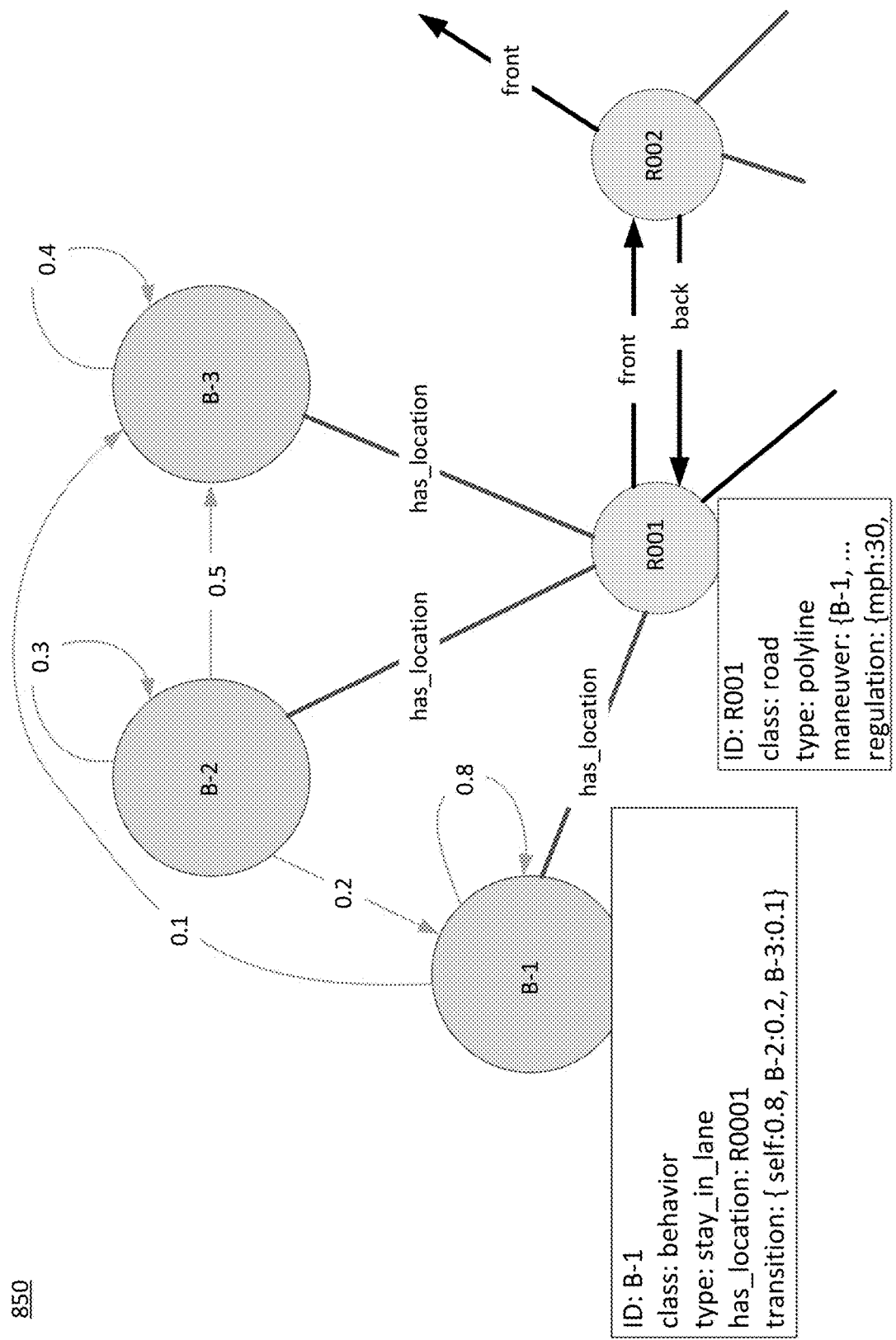

A visual representation of a snapshot of an example behavioral model graph dataset for a map section is shown in FIGS. 8A-8B, which depicts an example visualization of the graph database structure for the behavioral models stored in the spatio-behavioral database 318. As shown in FIG. 8A, the road nodes are labeled with a '1' and the adjacency relations are represented as a connection between the road nodes. The behavioral nodes are represented as the unlabeled circles in FIG. 8A, and the connections between the road nodes and the behavioral nodes represent the locality property. As shown in further detail in FIG. 8B, the links connecting the various behavioral nodes represent a maneuver transition probability. The behavioral model graph dataset 800 shown in FIG. 8A may thus constitute a collection of behavioral models for particular maneuvers, which are spatially-linked to corresponding locations (e.g. road segments, tiles, etc.). The behavioral model graph dataset 800 shown in FIG. 8A is by way of example, and of course may include any suitable number of road nodes and behavioral nodes to cover a suitable region of any suitable size (e.g. an intersection, several streets, an entire city, etc.). The spatio-behavioral database 318 may store any suitable number of behavioral models in the behavioral model graph dataset format for any suitable number of such regions.

Thus, the various behavioral nodes represent a behavioral model associated with a specific type of maneuver that was trained in accordance with the dynamic and static data as discussed above with reference to FIGS. 5A-5B. With reference to FIG. 8B, the portion of the behavioral model graph 850 includes three behavioral nodes B-1, B-2, B-3 connected to a road node R001. Thus, the road node R001 represents a particular location associated with the map that is derived from the static data discussed above with reference to FIG. 5A, for instance. This road node R001 may thus represent a particular geographic location such as a road segment or map tile, for instance, for which various maneuver taxonomies may be associated. These different maneuver taxonomies are represented in FIG. 8B as the respective behavioral nodes B-1, B-2, and B-3. As an illustrative example, the behavioral node B-1 may represent a vehicle remaining in the current lane, behavioral node B-2 may represent a vehicle cutting out left, and the behavioral node B-3 may represent the vehicle cutting in left, as shown in FIG. 4 as the maneuver sequences 310 that have been classified via the maneuver classification 308.

The arrows between the various behavioral nodes represent, for the particular maneuver taxonomy, transition probabilities that represent the probability that the vehicle will transition from one type of maneuver (e.g. one associated with B-1) to another maneuver (e.g. one associated with B-3), which is a 10% probability in this example. As an illustrative example, if a first vehicle has been following a second vehicle for ten minutes and the second vehicle is identified as slowing down, the first vehicle may have a particular probability of overtaking the second vehicle at a particular instance in time. Of course, the structure and transition probabilities may evolve over time in a dynamic manner as additional data is collected, and thus the example shown in FIG. 8B represents the transition probabilities for various maneuver transitions with a correlated location (road node) based upon a particular instance in time for which the behavioral model is trained and as applicable to a vehicle querying the behavioral model in a location-based manner. In other words, while the links between the road nodes will likely not change very often (e.g., for road construction, detours, etc.), the links between behavioral nodes are dynamic in nature and may change as new naturalistic data is captured to reflect the actual behaviors and transitions between maneuvers.

Thus, and turning back to FIG. 8A, the set of behavioral models stored in the spatio-behavioral database 318 may have a structure provided by the example shown, such that each particular location (e.g. road tile or road segment as represented by the road nodes labeled with a 1) may be associated with a set of particular maneuvers represented by the linked behavioral nodes (unlabeled). Thus, as a vehicle moves between different geographic locations, the vehicle may utilize different portions of the behavioral model that is identified with the vehicle's corresponding location with respect to a road node.

This structure enables an AV to query the spatio-behavioral database 318 via the API 320 for a local behavior using a specific location of the vehicle that matches a specific road node in the behavioral model, as shown in FIG. 3 for example. The queries discussed herein may be performed in real-time or offline, recognizing latency limits for queries that require data aggregation across multiple models, although these types of queries generally do not have real-time application needs. To do so, in an aspect the behavioral model graph dataset may be implemented as a layer on top of existing map data-structures such as lanelets, OpenDrive, or Road Experience Management (REM), which allows for queries on dynamic traffic behaviors. Examples are provided in further detail below with respect to the various use cases and employed mechanisms (e.g. via API 212) for querying the spatio-behavioral database 318 and extracting useful information. In an aspect, the node link structure described above provides a meta-geographical model that enables behavioral queries at multiple scale levels (e.g. road segment, local area, municipality, city, county, state, country, etc.). Aspects include the spatio-behavioral database 318 storing, in addition to the location data associated with the road nodes, any suitable type of contextual parameters related to driving at specific geolocations such as, for instance, the time of day, weather conditions, etc. Additionally or alternatively, the spatio-behavioral database 318 may store separate behavioral model graph datasets to facilitate queries for data using one or more of a specific location, time of day, day of the week, weather conditions, etc., which may then provide data representing driving behavior in accordance with the specific data or parameters that is/are queried.

As described herein, the behavioral model graph dataset may store valuable data that may be extracted for various purposes. This may include, for instance, the aforementioned traffic behavior analytics as shown FIG. 2. Additionally or alternatively, the behavioral model graph dataset may be queried via any suitable type of API (e.g. the API 212 as shown in FIG. 2) to extract data by users, human-driven vehicles, ADAS systems, and/or AVs.

Figure 9A:
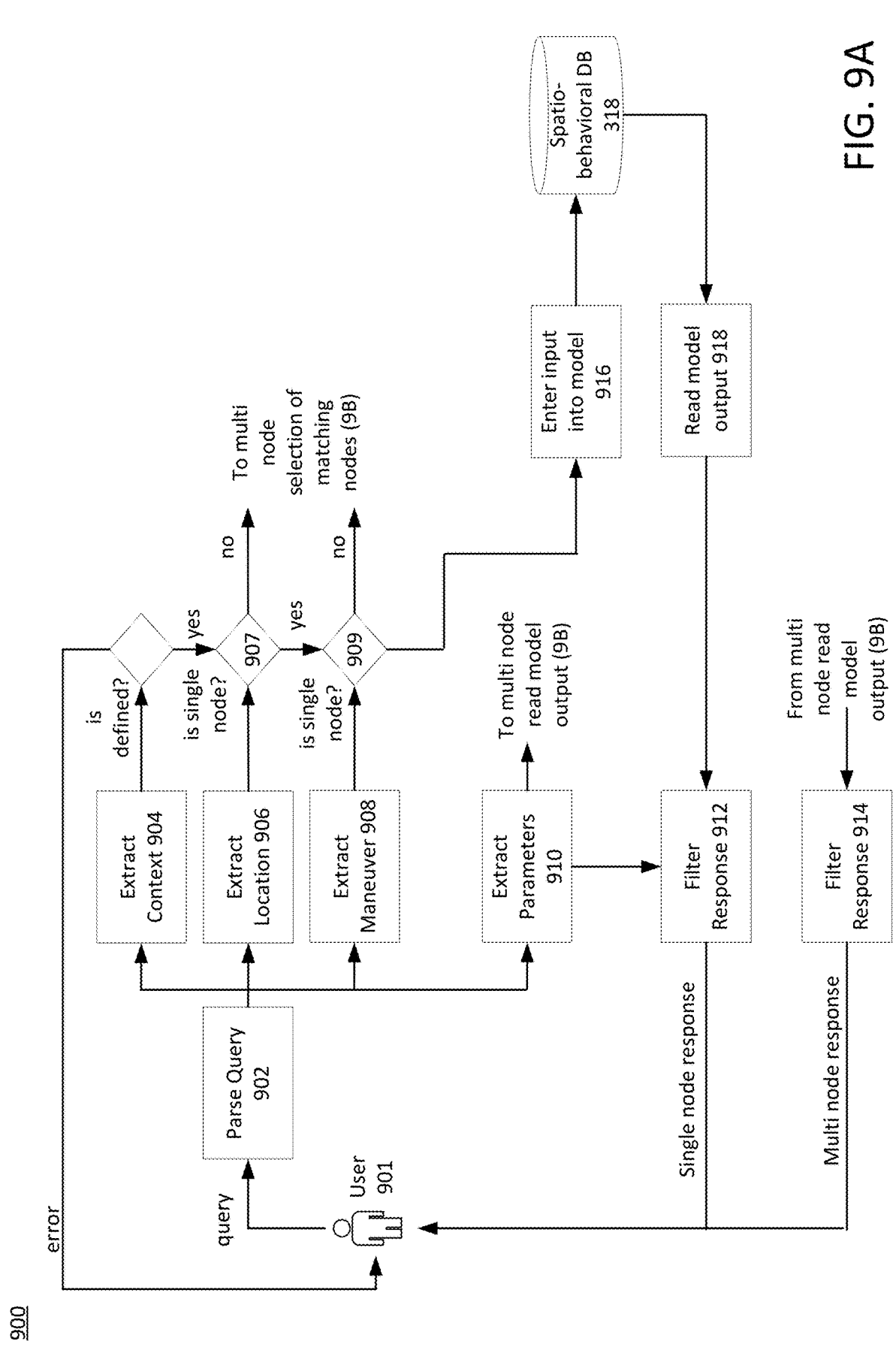
FIGS. 9A and 9B illustrate example API querying processes for extracting data from a stored behavioral model graph dataset, in accordance with one or more aspects of the present disclosure.
Figure 9B:
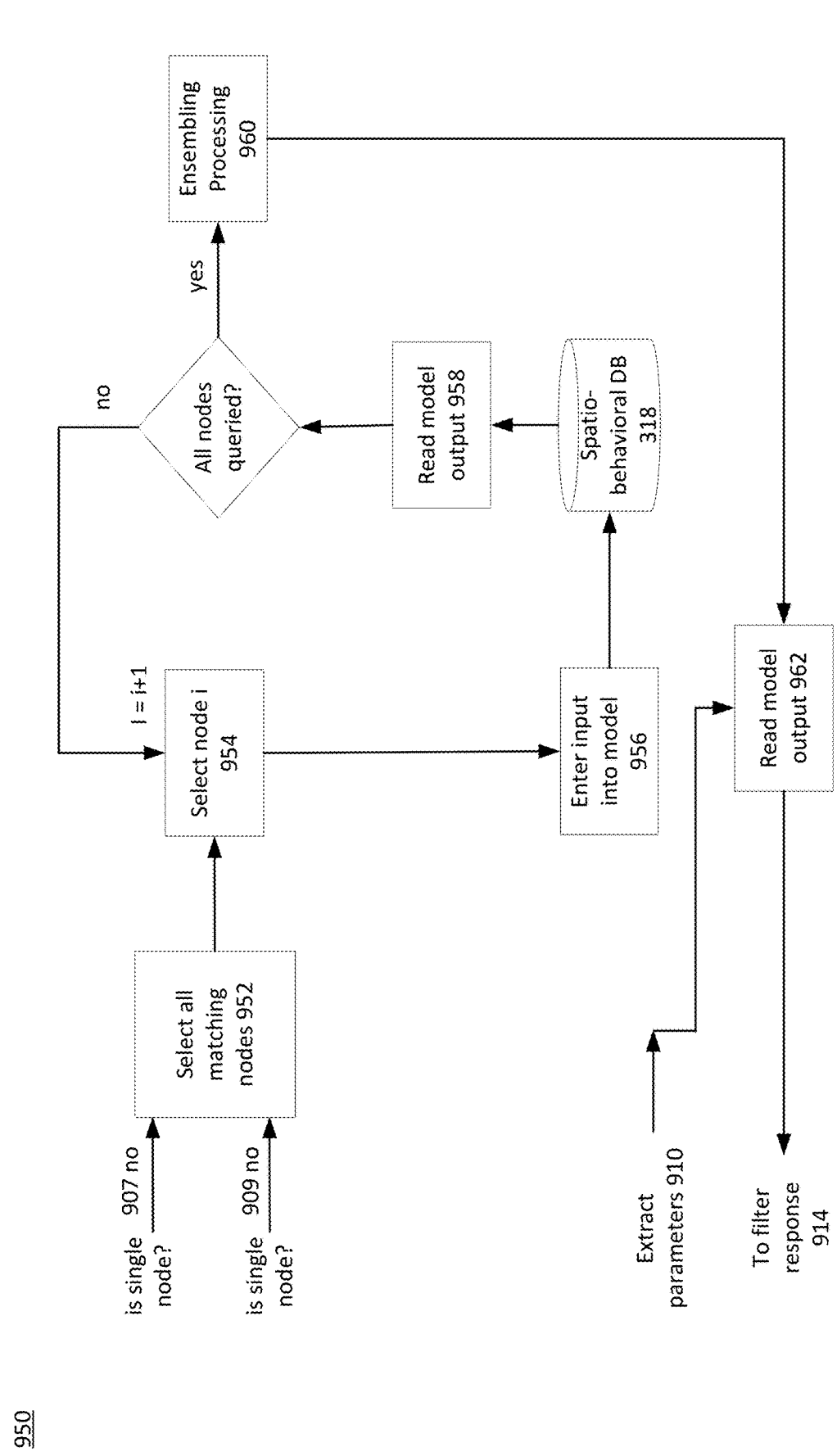

As an example, a query may be linked to, or otherwise based upon, a specific context or application for which specific type of data is specified that is to be extracted from the stored behavioral model graph dataset. A query may be associated with any suitable portion of the stored behavioral model graph datasets, which may include the behavioral models themselves, parameters associated with the behavioral models as discussed herein, inputs and outputs to the behavioral models, locations associated with the behavioral models, etc. For example, in some cases a single node may be queried, such as via an AV at a particular location identified with a road node for instance. However, in other cases a query may be associated with data for a particular region that is requested, and thus may involve querying multiple nodes. In various aspects, both single node and multi-node type queries may be performed with respect to the behavioral model graph dataset stored in the spatio-behavioral database 318. FIGS. 9A and 9B illustrate additional details associated with the API querying process for extracting data from the stored behavioral model graph dataset, with 9A representing an example process for a single node query and FIG. 9B representing an example process for a multiple node query.

As shown in FIG. 9A, the user 901 may represent, for example, a vehicle automation system or a human user performing analytics on the database backend. The query may be constructed in any suitable format, manner, and/or in accordance with any suitable protocol such as a query constructed in SQL-type language, for example, that defines a driving situation (context) with location and maneuver attributes and requested parameters in which the user 901 is interested. The API 212 functions to parse the query at block 902 and, if the driving context (situation) is sufficiently defined, the query will identify the location and maneuvers of interest and any other suitable type of contextual search parameters that may be relevant to determining a specific type of driving behavior at a particular time, place, and under particular conditions such as, for instance, the time of day, weather conditions, etc. The single node queries may include, for example, queries related to parameters that affect the customization of an ego vehicle in a particular instance. Examples of such single node queries in a natural language expression include the following:

What is the average headway distance with following vehicle in same lane and direction for [this] road segment?

What is the average breaking force used when entering [the next] curve?

How long do vehicles wait at [this] 4-way intersection when stopped?

What is the average lateral spacing between agents traveling in the same and opposite directions?

Each of these queries may refer to a unique location and maneuver, and so the query can be directed to the particular road node and the linked behavioral node that reflects that maneuver, as shown in FIGS. 8A-8B for instance. Therefore, the information can be extracted from the behavioral model graph dataset stored in the spatio-behavioral database 318. In an aspect, the query includes identifying the behavioral node that satisfies the query predicate, translating the question into the input for the model, and retrieving and filtering the correct answer. Thus, the query may include matching a location defined in the query for a road node behavioral model graph dataset stored in the spatio-behavioral database 318 and the linked behavioral model(s) that match the location and particular maneuver(s) linked to that road node location.

FIG. 9B includes additional details for a multiple node query of the behavioral model graph dataset stored in the spatio-behavioral database 318. In the example shown in FIG. 9B, there are multiple matching nodes, and thus the query is repeated for each of these nodes and an ensemble strategy is performed to aggregate the data from multiple related nodes.

Some examples of multiple node queries may involve either a larger geographical location with interest in one type of maneuver, a single road node but multiple maneuver types, or multiples of both types. Examples of such multi-node queries in natural language include the following:

What is the gap size (distance) for right lane changes in Germany?

What is the average lateral distance in [this] road segment?

What is the average percentage of time driven above the road speed limit in New York City?

Thus, as shown in FIG. 9B, providing solution to these kinds of queries requires querying multiple behavioral nodes and applying an ensemble logic to combine predictions from the multiple behavioral models. In other words, aspects include the ensembling logic applied at block 960 in FIG. 9B being performed such that each selected behavioral model makes a contribution to the ensemble, which outputs the final prediction that is returned to the user 901 via the reading of the output model block 962 and filtering block 914. Additional details associated with the ensembling process as shown in FIG. 9B at block 960 are provided below with reference to FIG. 10.

The ensembling process performed at block 960 may include the combination of model outputs for a multi node query to construct the query response. Depending on the particular type of query that is made, the aspects described herein may include performing the ensembling in accordance with any suitable strategy or technique. Two examples of ensembling techniques include bagging and boosting, which are described in further detail below, but the aspects herein are not limited to these particular examples. For example, other ensembling strategies could be applied such as learned ensembles using machine learning techniques.

Figure 10:
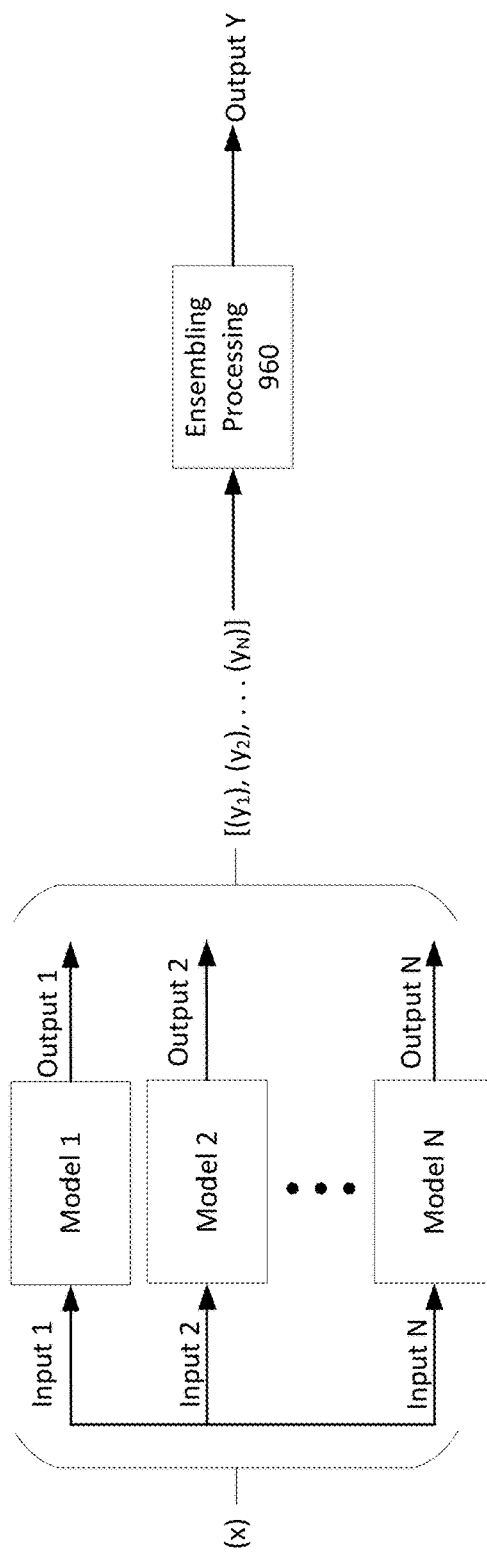
FIG. 10 illustrates an example of an ensembling process, in accordance with one or more aspects of the present disclosure.

Bagging may be implemented as one example of the ensembling process, which may be particularly useful for queries that request "average" data values, as this technique is focused on reducing the variance of the individual behavioral model predictions. With reference to FIG. 10, depending on the amount of nodes involved, a weighted combination may be applied to each of the behavioral model predictions following $Y=\Sigma_{i=1}^{N}(w_i(y_i))$, with the weights $w_i$ being applied either equally or following a predefined logic scheme. For example, more weight may be applied to behavioral models belonging to road segments closer to the current location or those that most closely match the road topology. As another example, a "majority vote," may be implemented in which $Y=\arg_K\max[\text{card}(i|w(y_i)=k)]$. As yet another example of a bagging technique, weighting of the behavioral model outputs y may be performed according to an average time spent on each segment (e.g. the probability mass of driving on the segment).

Boosting may be implemented as another example of the ensembling process, which may particularly useful for queries that request a "maximum" value of a parameter, since each behavioral model in the sequence is fitted giving more importance to what the previous model could not handle, thus creating a strong bias in the distributions of the response. For example, the predictions may be guided using the ensemble learning method adaboost, which may utilize the relationship $Y=\Sigma_{i=1}^{N}(c_i\times(y_i))$, in which $c_i$ represents the sequence coefficients and yi represents the model predictions. When large number of models are involved, this solution might become too complex, and thus approximation techniques may be applied such as those described in Merler, S., Caprile, B., & Furlanello, C. (2007); Parallelizing Ada-Boost by weights dynamics. Computational statistics & data analysis, 51(5), 2487-2498.

Figure 11:
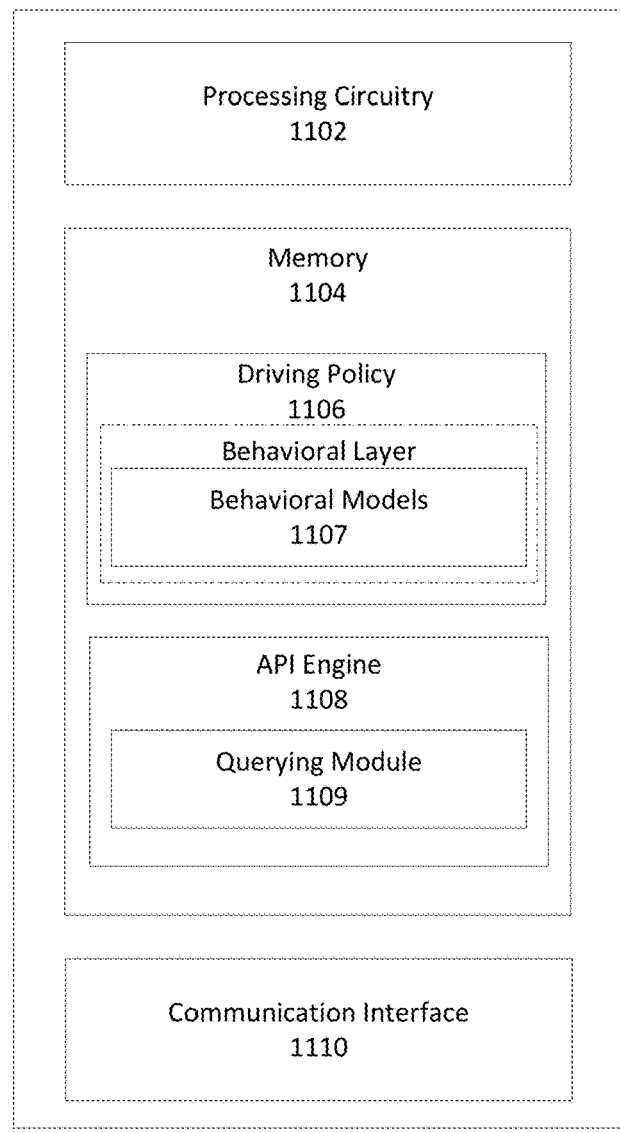
FIG. 11 illustrates an example of a computing device, in accordance with one or more aspects of the present disclosure.

FIG. 11 illustrates an exemplary computing device, in accordance with various aspects of the present disclosure. The computing device 1100 (also referred to herein as local processing circuitry or a local processing system) may be implemented as part of a human-driven, ADAS vehicle, and/or AV as discussed herein, which uses a driving policy to navigate and make decisions regarding specific maneuvers and when to execute specific maneuvers in accordance with a trained behavioral model. Again, the aspects described herein are not limited to the examples described herein, and the functions performed by the computing device 1100 in this example may additionally or alternatively be performed by other components of a vehicle in which the computing device 1100 is implemented.

In an aspect, the computing device 1100 may be implemented in different ways depending upon the particular application, type, and use with respect to the vehicle in which it is installed or otherwise forms a part. For instance, computing device 1100 may be identified with one or more portions of a vehicle's safety system. Continuing this example, the computing device 1100 may include processing circuitry 1102 as well as the one or more memories 1104. The computing device 1100 may be integrated as part of a vehicle in which it is implemented, as one or more virtual machines running as a hypervisor with respect to one or more of the vehicle's existing systems, as a control system of an AV, an ECU of the AV, etc. As another example, the computing device 1100 may be implemented as a computing system to facilitate queries for traffic behavior analytics 213, as discussed herein.

Thus, the computing device 1100 may be implemented using existing components of an AV's safety system or other suitable systems, and be realized via a software update that modifies the operation and/or function of one or more of these processing components. In other aspects, the computing device 1100 may include one or more hardware and/or software components that extend or supplement the operation of the AV's safety system or other suitable systems. This may include adding or altering one or more components of the AV's safety system or other suitable systems. In yet other aspects, the computing device 1100 may be implemented as a stand-alone device, which is installed as an after-market modification to the AV in which it is implemented.

The computing device 1100 may also form a part of (or the entirety of) a telematics module 201.1-201.N as discussed herein with respect to FIG. 2, for example. Regardless of the particular implementation, to perform the various functionality as described herein, the computing device 1100 may include processing circuitry 1102, a memory 1104, and a communication interface 1110. The components shown in FIG. 11 are provided for ease of explanation, and aspects include the computing device 1100 implementing additional, less, or alternative components as those shown in FIG. 11.

In various aspects, the processing circuitry 1102 may be configured as any suitable number and/or type of computer processors, which may function to control the computing device 1100 or other components of the vehicle in which it is implemented. Processing circuitry 1102 may be identified with one or more processors (or suitable portions thereof) implemented by the computing device 1100. For example, the processing circuitry 1102 may, for example, be identified with one or more processors such as a host processor, a digital signal processor, one or more microprocessors, graphics processors, microcontrollers, an application-specific integrated circuit (ASIC), part (or the entirety of) a field-programmable gate array (FPGA), etc.

In any event, aspects include the processing circuitry 1102 being configured to carry out instructions to perform arithmetical, logical, and/or input/output (I/O) operations, and/or to control the operation of one or more components of computing device 1100 to perform various functions associated with the aspects as described herein from the perspective of a vehicle that utilizes trained behavioral models in a locally-relevant manner. For example, the processing circuitry 1102 may include one or more microprocessor cores, memory registers, buffers, clocks, etc., and may generate electronic control signals associated with electronic components to control and/or modify the operation of one or more components of the computing device 1100 and/or vehicle in which it is implemented as discussed herein. Moreover, aspects include processing circuitry 1102 communicating with and/or controlling functions associated with the memory 1104 and/or the communication interface 1110.

In an aspect, the memory 1104 stores data and/or instructions such that, when the instructions are executed by the processing circuitry 1102, the processing circuitry 1102 performs various functions as described herein. The memory 1104 can be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 1104 can be non-removable, removable, or a combination of both. For example, the memory 1104 may be implemented as a non-transitory computer readable medium storing one or more executable instructions such as, for example, logic, algorithms, code, etc.

As further discussed below, the instructions, logic, code, etc., stored in the memory 1104 are represented by the various modules as shown in FIG. 11, which may enable the aspects disclosed herein to be functionally realized. Alternatively, if the aspects described herein are implemented via hardware, the modules shown in FIG. 11 associated with the memory 1104 may include instructions and/or code to facilitate control and/or monitor the operation of such hardware components. In other words, the modules shown in FIG. 11 are provided for ease of explanation regarding the functional association between hardware and software components. Thus, aspects include the processing circuitry 1102 executing the instructions stored in these respective modules in conjunction with one or more hardware components to perform the various functions associated with the aspects as further discussed herein.

In an aspect, the executable instructions stored in the driving policy module 1106 may facilitate, in conjunction with the processing circuitry 1102, storing and/or accessing the stored behavioral model for a specific maneuver at a particular location, which may be in response to a query performed via the API engine 1108 and querying module 1109. Thus, behavioral models 1107 stored in the memory 1104 may be trained or otherwise generated (e.g. offline) in accordance with a particular maneuver to be performed by AVs at a corresponding geolocation, as discussed herein. Of course, the behavioral models 1107 may be stored in another memory location or otherwise accessed by the AV in various ways. Based upon the particular location of the AV and the maneuver being performed, the AV may access the behavioral models 1107 in real-time (e.g. if the behavioral models 1107 have been previously or recently updated) or update the behavioral models 1107 using a transmitted query and response via an API before doing so, as discussed herein.

For instance, aspects include the behavioral models 1107 stored in the memory 1104 being trained or otherwise generated offline. An updating process may then implement a curation of data from various data sources (e.g. the static and dynamic semantic data), which may be crowdsourced as described herein with reference to FIG. 3, for instance (e.g. the crowdsourced naturalistic data). The behavioral model generation process may thus update the behavioral models for a particular spatial region as new semantic data is received. This is done to reflect changes in observed behavior over time. In this way, it is ensured that any queries for data associated with the behavioral models is done on the most up-to-date models, which are either stored in memory 1104 and/or obtained via queries (e.g. for data associated with the behavioral models stored in the spatio-behavioral database 318). Optionally, aspects include the memory 1104 and/or spatio-behavioral database 318 storing older behavioral models, and a combination of outputs from such older behavioral models may then be used to provide historic analysis such as trends, for instance.

Again, the driving policy 1106 may represent various mathematical models that instruct an AV how to navigate or otherwise execute trained maneuvers, which may include a driving style that is based on locally-derived dynamic data as discussed herein. The driving policy 1106 may thus include the various parameters associated with the AVs SDM, as well as the implementation of the behavioral models 1107 that may include the behavioral layer as shown in FIG. 11. The behavioral models 1107 may include, for example, a set of spatially-linked behavioral models trained as discussed herein, for example, in FIGS. 5A-5B. These may be stored locally in the memory 1104, updated dynamically as the vehicle in which the computing device 1100 is implemented navigates to locations that correspond to the road nodes in the behavioral model graph dataset, or queried and updated on the fly, as discussed herein. The behavioral models 1107 utilized by the AV may be provided as an input to the behavioral layer of the driving policy 1106 to execute a specific maneuver at a specific geolocation and/or under a specific set of conditions, as discussed herein.

To transmit and receive data, aspects include the computing device 1100 implementing a communication interface 1110 (or utilize such interfaces that are part of a vehicle's existing safety system or other suitable systems or components). The communication interface 1110 may operate to enable communications in accordance with a suitable communication protocol. The communication interface may function to support the functionality described herein with respect to the telematics modules 201.1-201.N, e.g. to transmit dynamic semantic data from moving actors associated with a particular environment to be navigated by AVs. For instance, the communication interface 1110 may facilitate the transmission of the various metrics indicative of the vehicle's driving style/behavior as discussed herein, which may represent the dynamic semantic data and/or static semantic data used to train the behavioral models and the accompanying behavioral model graph dataset for a map section, map tile, region, etc., stored in the spatio-behavioral database 318.

The communication interface 1110 may facilitate performing queries via an API engine 1108 and the querying module 1109. The API engine 1108 may thus function to, in conjunction with the processing circuitry 1108, determine, format, and transmit a specific type of query, as well as receive, decode, and update the behavioral models 1107 to then execute (e.g. perform a maneuver) using the results of such a query returned from the behavioral model graph dataset, as discussed herein. Thus, the communication interface 1110 may facilitate the vehicle in which it is implemented receiving data in response to API queries to determine a specific type of behavioral model to use for a particular location and maneuver to be performed, as discussed herein.

Figure 12:
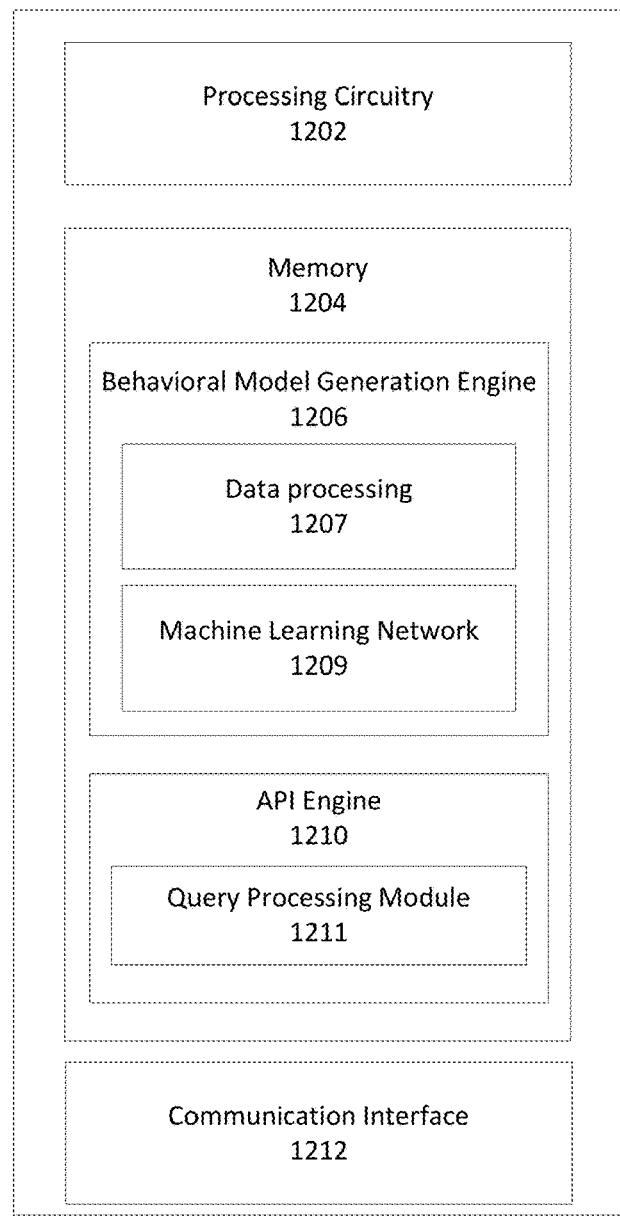
FIG. 12 illustrates an example of another computing device, in accordance with one or more aspects of the present disclosure.

FIG. 12 illustrates an exemplary device, in accordance with various aspects of the present disclosure. The computing device 1200 may be implemented as part of (or the entirety of) an infrastructure component discussed herein, which may perform operations such as receiving transmitted static and dynamic semantic data, training and storing behavioral models, and providing data in response to specific queries of the stored behavioral model graph dataset. For instance, the computing device 1200 may be implemented as various infrastructure or network components such as a server, computer, cloud-based infrastructure component, etc.

In an aspect, the computing device 1200 may include processing circuitry 1202 as well as the one or more memories 1204 and a communication interface 1212. The components shown in FIG. 12 are provided for ease of explanation, and aspects include the computing device 1200 implementing additional, less, or alternative components as those shown in FIG. 12.

In various aspects, the processing circuitry 1202 may be configured as any suitable number and/or type of computer processors, which may function to control the computing device 1200 or other components of the component in which it is implemented. Processing circuitry 1202 may be identified with one or more processors (or suitable portions thereof) implemented by the computing device 1200. For example, the processing circuitry 1202 may, for example, be identified with one or more processors such as a host processor, a digital signal processor, one or more microprocessors, graphics processors, microcontrollers, an application-specific integrated circuit (ASIC), part (or the entirety of) a field-programmable gate array (FPGA), etc.

In any event, aspects include the processing circuitry 1202 being configured to carry out instructions to perform arithmetical, logical, and/or input/output (I/O) operations, and/or to control the operation of one or more components of computing device 1200 to perform various functions associated with the aspects as described herein from the perspective of one or more components that may communicate with one or more vehicles (e.g. AVs). For example, the processing circuitry 1202 may include one or more microprocessor cores, memory registers, buffers, clocks, etc., and may generate electronic control signals associated with electronic components to control and/or modify the operation of one or more components of the computing device 1200 as discussed herein. Moreover, aspects include processing circuitry 1202 communicating with and/or controlling functions associated with the memory 1204 and/or the communication interface 1212.

In an aspect, the memory 1204 stores data and/or instructions such that, when the instructions are executed by the processing circuitry 1202, the processing circuitry 1202 performs various functions as described herein. The memory 1204 can be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 1204 can be non-removable, removable, or a combination of both. For example, the memory 1204 may be implemented as a non-transitory computer readable medium storing one or more executable instructions such as, for example, logic, algorithms, code, etc.

As further discussed below, the instructions, logic, code, etc., stored in the memory 1204 are represented by the various modules as shown in FIG. 12, which may enable the aspects disclosed herein to be functionally realized. Alternatively, if the aspects described herein are implemented via hardware, the modules shown in FIG. 12 associated with the memory 1204 may include instructions and/or code to facilitate control and/or monitor the operation of such hardware components. In other words, the modules shown in FIG. 12 are provided for ease of explanation regarding the functional association between hardware and software components. Thus, aspects include the processing circuitry 1202 executing the instructions stored in these respective modules in conjunction with one or more hardware components to perform the various functions associated with the aspects as further discussed herein.

In an aspect, the executable instructions stored in the behavioral model generation engine 1206 may facilitate, in conjunction with the processing circuitry 1202, training or otherwise generating behavioral models using the static and dynamic sematic data as discussed herein. For example, the data processing module 1207 may include instructions to perform data preparation, labeling, filtering, and maneuver classification as discussed herein with reference to FIGS. 3 and 4. The machine learning network 1209 may, for example, use the results of the processed data via the data processing module 1207 to perform behavioral model generation and/or training in accordance with any suitable type of machine learning techniques. For instance, the machine learning training network 1209 may implement a neural network such as the LSTM as discussed herein with respect to FIGS. 5A-5B to generate maneuver and geolocation specific behavioral models.

In an aspect, the data processing module 1207 may additionally store the generated behavioral models as a behavioral model graph dataset in a suitable storage location, such as the spatio-behavioral database 318, for example, as discussed herein with reference to FIG. 3. Thus, the data processing module 1207 may facilitate in conjunction with the processing circuitry 1202 the conversion of behavioral models to the graph dataset format as discussed herein with reference to FIGS. 8A-8B, for example. The behavioral model graph dataset may be stored locally in the memory 1204 (not shown) or in another accessible location as discussed herein (e.g. via transmission to another database or storage location via the communication interface 1212).

To transmit and receive data, aspects include the computing device 1200 implementing a communication interface 1212. The communication interface 1212 may operate to enable communications in accordance with a suitable communication protocol. The communication interface may function to support the functionality described herein with respect to receiving queries and/or other data transmitted by vehicles or other components (e.g. the computing device 1100) to receive the static and dynamic semantic data associated with a particular environment to be navigated by AVs.

In an aspect, the API engine 1210 may function to transmit and receive queries and/or other data via the communication interface 1212. To do so, the querying processing module 1211 may include instructions that, when executed via the processing circuitry 1202, facilitate the decoding of received single and/or multi-node queries, as discussed herein with reference to FIGS. 9A-9B. The querying processing module 1211 may thus interpret a particular query for data and/or parameters associated with the behavioral model graph datasets as discussed herein. For instance, this may include matching a geolocation specified in a query to a geolocation represented by one of the road nodes in the behavioral model graph dataset, and determining the behavioral models and/or other data to extract and transmit in response to the query in accordance with the behavioral nodes connected to the identified road node(s). The querying processing module 1211 may also process queries and, once the appropriate querying information is determined, perform a multi-node query using the ensembling process as discussed herein with respect to FIG. 10.

Once the queried data has been retrieved, the querying processing module 1211 may function in conjunction with the communication interface 1212 to return the queried data via the API performed by the API engine 1210. Thus, the query processing module 1211 may function to, in conjunction with the processing circuitry 1202 and the API engine 1210, format and transmit the results of such a query returned from the behavioral model graph dataset, as discussed herein.

The aspects described herein may advantageously facilitate various applications by way of the storage and querying of the behavioral model graph dataset. For instance, once the results of a query are returned, an automated driving system may employ these results for customizing its behavior by loading the required parameters in its run-time environment. In addition, the results may be employed as a reporting mechanism to derive data-driven differences (gaps) between current driving behaviors and local regulations, or to condition reporting of automated vehicle performance in accordance to local driving behavior. Several examples of practical applications that may utilize the aspects as described herein include adjusting ego behavior, predicting better targets, fine tuning validation results to an geo location, and providing a concrete, data driven case to regulators for pre-deployment regulatory decisions.

Examples

The following examples pertain to further aspects.

Example 1 is a computing device, comprising: a communication interface configured to receive static semantic data associated with stationary landmarks and dynamic semantic data from road actors, the static semantic data and the dynamic semantic data each being associated with an environment to be navigated by autonomous vehicles (AVs); and processing circuitry configured to generate a set of behavioral models using the static semantic data and the dynamic semantic data, each one of the set of behavioral models being associated with a maneuver to be performed by an AV at a corresponding geolocation, wherein the communication interface is further configured to receive, from the AV, a query associated with at least one of the behavioral models from among the set of behavioral models having a corresponding geolocation that matches a geolocation of the query received from the AV, and to transmit data associated with the at least one of the behavioral models in response to the query to cause the AV to perform a maneuver in accordance with the received data associated with at least one of the received behavioral models In Example 2, the subject matter of Example 1, wherein the AV has an associated driving policy, and wherein the data associated with at least one of the behavioral models is received by the AV and provided as an input to a behavioral layer of the AV's driving policy to execute the maneuver.

In Example 3, the subject matter of any combination of Examples 1-2, wherein the processing circuitry is configured to generate the set of behavioral models in accordance with a neural network In Example 4, the subject matter of any combination of Examples 1-3, wherein the AV utilizes a safety driving model (SDM) that defines safety guidelines under which the AV operates within the environment, and wherein the processing circuitry is configured to generate a behavioral model from among the set of behavioral models using, as inputs, (i) a geolocation of the AV, (ii) a set of metrics comprising temporally sequential data associated with historic delta observations for the AV and a plurality of other AVs at the same geolocation, and (iii) an SDM label that limits output behaviors of the generated behavioral model to safe observed behaviors as defined by the SDM In Example 5, the subject matter of any combination of Examples 1-4, wherein the processing circuitry is configured to store the set of behavioral models in a database having a graph dataset structure to provide a behavioral model graph dataset.

In Example 6, the subject matter of any combination of Examples 1-5, wherein the behavioral model graph dataset includes (i) a plurality of road nodes interconnected with one another per edge representation in the graph dataset, each one of the plurality of road nodes representing respective geolocations, and (ii) a plurality of behavioral nodes, each one of the plurality of behavioral nodes being connected to at least one of the plurality of road nodes, with each respective one of the behavioral nodes representing a behavioral model associated with a particular maneuver to be performed by the AV at a corresponding geolocation associated with the respectively connected road node.

In Example 7, the subject matter of any combination of Examples 1-6, wherein the processing circuitry is further configured to identify the data associated with at least one of the behavioral models in response to the query by matching the geolocation of the query to a geolocation represented by a respective one of the plurality of road nodes, and to determine the data associated with the at least one of the behavioral models to transmit in response to the query in accordance with the behavioral nodes connected to the identified respective one of the plurality of road nodes In Example 8, the subject matter of any combination of Examples 1-7, wherein the query is a multi-node query for data associated with the behavioral model graph dataset, and wherein the processing circuitry is further configured to determine the data associated with at least one of the behavioral models to transmit in response to the multi-node query by performing an ensembling process that includes at least one of bagging or boosting.

Example 9 is an electronic control unit (ECU) associated with an autonomous vehicle (AV), the ECU comprising: a communication interface configured to transmit dynamic semantic data from road actors, the dynamic semantic data being associated with an environment to be navigated by AVs; and processing circuitry configured to generate a query associated with at least one of a set of behavioral models that have been generated using the dynamic semantic data and static semantic data identified with stationary landmarks associated with the environment, each one of the set of behavioral models being associated with a maneuver to be performed by the AV at a corresponding geolocation, wherein the communication interface is further configured to transmit the query and, in response to the transmitted query, to receive data associated with at least one of the behavioral models from among the set of behavioral models having a corresponding geolocation that matches a geolocation specified by the query, and to perform a maneuver in accordance with the received data associated with at least one of the behavioral models.

In Example 10, the subject matter of Example 9, wherein the AV utilizes a driving policy for navigation in the environment, and wherein the data associated with at least one of the behavioral models received by the AV is provided as an input to a behavioral layer of the driving policy to execute the maneuver.

In Example 11, the subject matter of any combination of Examples 9-10, wherein the AV utilizes a safety driving model (SDM) that defines safety guidelines under which the AV operates within the environment, and wherein a behavioral model from among the set of behavioral models is generated using, as inputs, (i) a geolocation of the AV, (ii) a set of metrics comprising temporally sequential data associated with historic delta observations for the AV and a plurality of other AVs at the same geolocation, and (iii) an SDM label that limits output behaviors of the generated behavioral model to safe observed behaviors as defined by the SDM In Example 12, the subject matter of any combination of Examples 9-11, wherein the set of behavioral models are stored in a database having a graph dataset structure to provide a behavioral model graph dataset, and wherein the query is transmitted via an application programming interface (API) to retrieve data from the behavioral model graph dataset.

In Example 13, the subject matter of any combination of Examples 9-12, wherein the behavioral model graph dataset includes (i) a plurality of road nodes interconnected with one another per edge representation in the graph dataset, each one of the plurality of road nodes representing respective geolocations, and (ii) a plurality of behavioral nodes, each one of the plurality of behavioral nodes being connected to at least one of the plurality of road nodes, with each respective one of the behavioral nodes representing a behavioral model associated with a particular maneuver to be performed by the AV at a corresponding geolocation associated with the respectively connected road node In Example 14, the subject matter of any combination of Examples 9-13, wherein the transmitted query results in an identification of the data associated with at least one of the behavioral models based upon a matching of a geolocation specified in the query to a geolocation represented by a respective one of the plurality of road nodes, and a determination of the data associated with at least one of the behavioral models in accordance with the behavioral nodes connected to the identified respective one of the plurality of road nodes In Example 15, the subject matter of any combination of Examples 9-14, wherein the query is a multi-node query for data associated with the behavioral model graph dataset, and wherein the transmitted query results in a determination of data associated with the at least one of the behavioral models based upon an ensembling process that includes at least one of bagging or boosting.

Example 16 is a computer-readable media associated with an autonomous vehicle (AV) having instructions stored thereon that, when executed by one or more processors, cause the AV to: transmit dynamic semantic data from road actors, the dynamic semantic data being associated with an environment to be navigated by autonomous vehicles (AVs); generate a query associated with at least one of a set of behavioral models that have been generated using the dynamic semantic data and static semantic data identified with stationary landmarks associated with the environment, each one of the set of behavioral models being associated with a maneuver to be performed by the AV at a corresponding geolocation; transmit the query via an application programming interface (API); and in response to the transmitted query, receive data associated with at least one of the behavioral models from among the set of behavioral models having a corresponding geolocation that matches a geolocation specified by the query, and to perform a maneuver in accordance with the received data associated with at least one of the received behavioral models.

In Example 17, the subject matter of Example 16, wherein the AV utilizes a driving policy for navigation in the environment, and wherein the computer-readable media further includes instructions that, when executed by one or more processors, cause the data associated with at least one of the behavioral models received by the AV to be provided as an input to a behavioral layer of the driving policy to execute the maneuver.

In Example 18, the subject matter of any combination of Examples 16-17, wherein the AV utilizes a safety driving model (SDM) that defines safety guidelines under which the AV operates within the environment, and wherein a behavioral model from among the set of behavioral models is generated using, as inputs, (i) a geolocation of the AV, (ii) a set of metrics comprising temporally sequential data associated with historic delta observations for the AV and a plurality of other AVs at the same geolocation, and (iii) an SDM label that limits output behaviors of the generated behavioral model to safe observed behaviors as defined by the SDM.

In Example 19, the subject matter of any combination of Examples 16-18, wherein the set of behavioral models are stored in a database having a graph dataset structure to provide a behavioral model graph dataset, and wherein the computer-readable media further includes instructions that, when executed by one or more processors, result in the query requesting data from the behavioral model graph dataset.

In Example 20, the subject matter of any combination of Examples 16-19, wherein the behavioral model graph dataset includes (i) a plurality of road nodes interconnected with one another per edge representation in the graph dataset, each one of the plurality of road nodes representing respective geolocations, and (ii) a plurality of behavioral nodes, each one of the plurality of behavioral nodes being connected to at least one of the plurality of road nodes, with each respective one of the behavioral nodes representing a behavioral model associated with a particular maneuver to be performed by the AV at a corresponding geolocation associated with the respectively connected road node.

In Example 21, the subject matter of any combination of Examples 16-20, wherein the transmitted query results in an identification of the data associated with at least one of the behavioral models based upon a matching of a geolocation specified in the query to a geolocation represented by a respective one of the plurality of road nodes, and a determination of the data associated with at least one of the behavioral models in accordance with the respective behavioral nodes connected to the identified respective one of the plurality of road nodes.

In Example 22, the subject matter of any combination of Examples 16-21, wherein the query is a multi-node query for data associated with the behavioral model graph dataset, and wherein the transmitted query results in a determination of the data associated with at least one of the behavioral models based upon an ensembling process that includes at least one of bagging or boosting.

Example 23 is a computing means, comprising: a communication means for receiving static semantic data associated with stationary landmarks and dynamic semantic data from road actors, the static semantic data and the dynamic semantic data each being associated with an environment to be navigated by autonomous vehicles (AVs); and processing means for generating a set of behavioral models using the static semantic data and the dynamic semantic data, each one of the set of behavioral models being associated with a maneuver to be performed by an AV at a corresponding geolocation, wherein the communication means further receives, from the AV, a query associated with at least one of the behavioral models from among the set of behavioral models having a corresponding geolocation that matches a geolocation of the query received from the AV, and transmits data associated with the at least one of the behavioral models in response to the query to cause the AV to perform a maneuver in accordance with the received data associated with at least one of the received behavioral models In Example 24, the subject matter of Example 23, wherein the AV has an associated driving policy, and wherein the data associated with at least one of the behavioral models is received by the AV and provided as an input to a behavioral layer of the AV's driving policy to execute the maneuver.

In Example 25, the subject matter of any combination of Examples 23-24, wherein the processing means generates the set of behavioral models in accordance with a neural network.

In Example 26, the subject matter of any combination of Examples 23-25, wherein the AV utilizes a safety driving model (SDM) that defines safety guidelines under which the AV operates within the environment, and wherein the processing means generates a behavioral model from among the set of behavioral models using, as inputs, (i) a geolocation of the AV, (ii) a set of metrics comprising temporally sequential data associated with historic delta observations for the AV and a plurality of other AVs at the same geolocation, and (iii) an SDM label that limits output behaviors of the generated behavioral model to safe observed behaviors as defined by the SDM In Example 27, the subject matter of any combination of Examples 23-26, wherein the processing means stores the set of behavioral models in a database having a graph dataset structure to provide a behavioral model graph dataset.

In Example 28, the subject matter of any combination of Examples 23-27, wherein the behavioral model graph dataset includes (i) a plurality of road nodes interconnected with one another per edge representation in the graph dataset, each one of the plurality of road nodes representing respective geolocations, and (ii) a plurality of behavioral nodes, each one of the plurality of behavioral nodes being connected to at least one of the plurality of road nodes, with each respective one of the behavioral nodes representing a behavioral model associated with a particular maneuver to be performed by the AV at a corresponding geolocation associated with the respectively connected road node.

In Example 29, the subject matter of any combination of Examples 23-28, wherein the processing means further identifies the data associated with at least one of the behavioral models in response to the query by matching the geolocation of the query to a geolocation represented by a respective one of the plurality of road nodes, and determines the data associated with the at least one of the behavioral models to transmit in response to the query in accordance with the behavioral nodes connected to the identified respective one of the plurality of road nodes In Example 30, the subject matter of any combination of Examples 23-29, wherein the query is a multi-node query for data associated with the behavioral model graph dataset, and wherein the processing means further determines the data associated with at least one of the behavioral models to transmit in response to the multi-node query by performing an ensembling process that includes at least one of bagging or boosting.

Example 31 is an electronic control unit (ECU) associated with an autonomous vehicle (AV), the ECU comprising: a communication means for transmitting dynamic semantic data from road actors, the dynamic semantic data being associated with an environment to be navigated by AVs; and processing means for generating a query associated with at least one of a set of behavioral models that have been generated using the dynamic semantic data and static semantic data identified with stationary landmarks associated with the environment, each one of the set of behavioral models being associated with a maneuver to be performed by the AV at a corresponding geolocation, wherein the communication means further transmits the query and, in response to the transmitted query, receives data associated with at least one of the behavioral models from among the set of behavioral models having a corresponding geolocation that matches a geolocation specified by the query, and performs a maneuver in accordance with the received data associated with at least one of the behavioral models.

In Example 32, the subject matter of Example 31, wherein the AV utilizes a driving policy for navigation in the environment, and wherein the data associated with at least one of the behavioral models received by the AV is provided as an input to a behavioral layer of the driving policy to execute the maneuver.

In Example 33, the subject matter of any combination of Examples 31-32, wherein the AV utilizes a safety driving model (SDM) that defines safety guidelines under which the AV operates within the environment, and wherein a behavioral model from among the set of behavioral models is generated using, as inputs, (i) a geolocation of the AV, (ii) a set of metrics comprising temporally sequential data associated with historic delta observations for the AV and a plurality of other AVs at the same geolocation, and (iii) an SDM label that limits output behaviors of the generated behavioral model to safe observed behaviors as defined by the SDM In Example 34, the subject matter of any combination of Examples 31-33, wherein the set of behavioral models are stored in a database having a graph dataset structure to provide a behavioral model graph dataset, and wherein the query is transmitted via an application programming interface (API) to retrieve data from the behavioral model graph dataset.

In Example 35, the subject matter of any combination of Examples 31-34, wherein the behavioral model graph dataset includes (i) a plurality of road nodes interconnected with one another per edge representation in the graph dataset, each one of the plurality of road nodes representing respective geolocations, and (ii) a plurality of behavioral nodes, each one of the plurality of behavioral nodes being connected to at least one of the plurality of road nodes, with each respective one of the behavioral nodes representing a behavioral model associated with a particular maneuver to be performed by the AV at a corresponding geolocation associated with the respectively connected road node In Example 36, the subject matter of any combination of Examples 31-35, wherein the transmitted query results in an identification of the data associated with at least one of the behavioral models based upon a matching of a geolocation specified in the query to a geolocation represented by a respective one of the plurality of road nodes, and a determination of the data associated with at least one of the behavioral models in accordance with the behavioral nodes connected to the identified respective one of the plurality of road nodes In Example 37, the subject matter of any combination of Examples 31-36, wherein the query is a multi-node query for data associated with the behavioral model graph dataset, and wherein the transmitted query results in a determination of data associated with the at least one of the behavioral models based upon an ensembling process that includes at least one of bagging or boosting.

Example 38 is a computer-readable media associated with an autonomous vehicle (AV) having instructions stored thereon that, when executed by one or more processor means, cause the AV to: transmit dynamic semantic data from road actors, the dynamic semantic data being associated with an environment to be navigated by autonomous vehicles (AVs); generate a query associated with at least one of a set of behavioral models that have been generated using the dynamic semantic data and static semantic data identified with stationary landmarks associated with the environment, each one of the set of behavioral models being associated with a maneuver to be performed by the AV at a corresponding geolocation; transmit the query via an application programming interface (API); and in response to the transmitted query, receive data associated with at least one of the behavioral models from among the set of behavioral models having a corresponding geolocation that matches a geolocation specified by the query, and to perform a maneuver in accordance with the received data associated with at least one of the received behavioral models.

In Example 39, the subject matter of Example 38, wherein the AV utilizes a driving policy for navigation in the environment, and wherein the computer-readable media further includes instructions that, when executed by one or more processor means, cause the data associated with at least one of the behavioral models received by the AV to be provided as an input to a behavioral layer of the driving policy to execute the maneuver.

In Example 40, the subject matter of any combination of Examples 38-39, wherein the AV utilizes a safety driving model (SDM) that defines safety guidelines under which the AV operates within the environment, and wherein a behavioral model from among the set of behavioral models is generated using, as inputs, (i) a geolocation of the AV, (ii) a set of metrics comprising temporally sequential data associated with historic delta observations for the AV and a plurality of other AVs at the same geolocation, and (iii) an SDM label that limits output behaviors of the generated behavioral model to safe observed behaviors as defined by the SDM.

In Example 41, the subject matter of any combination of Examples 38-40, wherein the set of behavioral models are stored in a database having a graph dataset structure to provide a behavioral model graph dataset, and wherein the computer-readable media further includes instructions that, when executed by one or more processor means, result in the query requesting data from the behavioral model graph dataset.

In Example 42, the subject matter of any combination of Examples 38-41, wherein the behavioral model graph dataset includes (i) a plurality of road nodes interconnected with one another per edge representation in the graph dataset, each one of the plurality of road nodes representing respective geolocations, and (ii) a plurality of behavioral nodes, each one of the plurality of behavioral nodes being connected to at least one of the plurality of road nodes, with each respective one of the behavioral nodes representing a behavioral model associated with a particular maneuver to be performed by the AV at a corresponding geolocation associated with the respectively connected road node.

In Example 43, the subject matter of any combination of Examples 38-42, wherein the transmitted query results in an identification of the data associated with at least one of the behavioral models based upon a matching of a geolocation specified in the query to a geolocation represented by a respective one of the plurality of road nodes, and a determination of the data associated with at least one of the behavioral models in accordance with the respective behavioral nodes connected to the identified respective one of the plurality of road nodes.

In Example 44, the subject matter of any combination of Examples 38-43, wherein the query is a multi-node query for data associated with the behavioral model graph dataset, and wherein the transmitted query results in a determination of the data associated with at least one of the behavioral models based upon an ensembling process that includes at least one of bagging or boosting.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A computing device, comprising:
   a communication interface configured to receive static semantic data associated with stationary landmarks and dynamic semantic data from road actors, the static semantic data and the dynamic semantic data each being associated with an environment to be navigated by autonomous vehicles (AVs); and
   processing circuitry configured to generate a set of behavioral models using the static semantic data and the dynamic semantic data, each one of the set of behavioral models being associated with a maneuver to be performed by an AV at a corresponding geolocation of the static semantic data and the dynamic semantic data used to generate each respective one of the set of behavioral models,
   wherein the communication interface is further configured to receive, from the AV, a query associated with at least one of the behavioral models from among the set of behavioral models having a corresponding geolocation that matches a geolocation specified by the query that is received from the AV, and to transmit data associated with the at least one of the behavioral models in response to the query to cause the AV to perform, at a geolocation corresponding to the static semantic data and the dynamic semantic data used to generate the at least one of the set of behavioral models, a maneuver in accordance with the transmitted data associated with the at least one of the set of behavioral models.

2. The computing device of claim 1, wherein the AV has an associated driving policy, and wherein the data associated with at least one of the behavioral models is received by the AV and provided as an input to a behavioral layer of the AV's driving policy to execute the maneuver.

3. The computing device of claim 1, wherein the processing circuitry is configured to generate the set of behavioral models in accordance with a neural network.

4. The computing device of claim 1, wherein the AV utilizes a safety driving model (SDM) that defines safety guidelines under which the AV operates within the environment, and wherein the processing circuitry is configured to generate a behavioral model from among the set of behavioral models using, as inputs, (i) a geolocation of the AV, (ii) a set of metrics comprising temporally sequential data associated with historic delta observations for the AV and a plurality of other AVs at the same geolocation, and (iii) an SDM label that limits output behaviors of the generated behavioral model to safe observed behaviors as defined by the SDM.

5. The computing device of claim 1, wherein the processing circuitry is configured to store the set of behavioral models in a database having a graph dataset structure to provide a behavioral model graph dataset.

6. The computing device of claim 5, wherein the behavioral model graph dataset includes (i) a plurality of road nodes interconnected with one another per edge representation in the graph dataset, each one of the plurality of road nodes representing respective geolocations, and (ii) a plurality of behavioral nodes, each one of the plurality of behavioral nodes being connected to at least one of the plurality of road nodes, with each respective one of the behavioral nodes representing a behavioral model associated with a particular maneuver to be performed by the AV at a corresponding geolocation associated with a respectively connected road node.

7. The computing device of claim 6, wherein the processing circuitry is further configured to identify the data associated with at least one of the behavioral models in response to the query by matching the geolocation of the query to a geolocation represented by a respective one of the plurality of road nodes, and to determine the data associated with the at least one of the behavioral models to transmit in response to the query in accordance with the behavioral nodes connected to the identified respective one of the plurality of road nodes.

8. The computing device of claim 6, wherein the query is a multi-node query for data associated with the behavioral model graph dataset, and wherein the processing circuitry is further configured to determine the data associated with at least one of the behavioral models to transmit in response to the multi-node query by performing an ensembling process that includes at least one of bagging or boosting.

9. An electronic control unit (ECU) associated with an autonomous vehicle (AV), the ECU comprising:

a communication interface configured to transmit dynamic semantic data from road actors, the dynamic semantic data being associated with an environment to be navigated by AVs; and processing circuitry configured to generate a query associated with at least one of a set of behavioral models that have been generated using the dynamic semantic data and static semantic data identified with stationary landmarks associated with the environment, each one of the set of behavioral models being associated with a maneuver to be performed by the AV at a corresponding geolocation of the static semantic data and the dynamic semantic data used to generate each respective one of the set of behavioral models, wherein the communication interface is further configured to transmit the query and, in response to the transmitted query, to receive data associated with at least one of the behavioral models from among the set of behavioral models having a corresponding geolocation that matches a geolocation specified by the query, and to perform, at a geolocation corresponding to the static semantic data and the dynamic semantic data used to generate the at least one of the set of behavioral models, a maneuver in accordance with the received data associated with the at least one of the set of behavioral models.

10. The ECU of claim 9, wherein the AV utilizes a driving policy for navigation in the environment, and wherein the data associated with at least one of the behavioral models received by the AV is provided as an input to a behavioral layer of the driving policy to execute the maneuver.

11. The ECU of claim 9, wherein the AV utilizes a safety driving model (SDM) that defines safety guidelines under which the AV operates within the environment, and wherein a behavioral model from among the set of behavioral models is generated using, as inputs, (i) a geolocation of the AV, (ii) a set of metrics comprising temporally sequential data associated with historic delta observations for the AV and a plurality of other AVs at the same geolocation, and (iii) an SDM label that limits output behaviors of the generated behavioral model to safe observed behaviors as defined by the SDM.

12. The ECU of claim 9, wherein the set of behavioral models are stored in a database having a graph dataset structure to provide a behavioral model graph dataset, and wherein the query is transmitted via an application programming interface (API) to retrieve data from the behavioral model graph dataset.

13. The ECU of claim 12, wherein the behavioral model graph dataset includes (i) a plurality of road nodes interconnected with one another per edge representation in the graph dataset, each one of the plurality of road nodes representing respective geolocations, and (ii) a plurality of behavioral nodes, each one of the plurality of behavioral nodes being connected to at least one of the plurality of road nodes, with each respective one of the behavioral nodes representing a behavioral model associated with a particular maneuver to be performed by the AV at a corresponding geolocation associated with the-a respectively connected road node.

14. The ECU of claim 13, wherein the transmitted query results in an identification of the data associated with at least one of the behavioral models based upon a matching of a geolocation specified in the query to a geolocation represented by a respective one of the plurality of road nodes, and a determination of the data associated with at least one of the behavioral models in accordance with the behavioral nodes connected to the identified respective one of the plurality of road nodes.

15. The ECU of claim 13, wherein the query is a multi-node query for data associated with the behavioral model graph dataset, and wherein the transmitted query results in a determination of data associated with the at least one of the behavioral models based upon an ensembling process that includes at least one of bagging or boosting.

16. A non-transitory computer-readable media associated with an autonomous vehicle (AV) having instructions stored thereon that, when executed by one or more processors, cause the AV to:

transmit dynamic semantic data from road actors, the dynamic semantic data being associated with an environment to be navigated by autonomous vehicles (AVs);

generate a query associated with at least one of a set of behavioral models that have been generated using the dynamic semantic data and static semantic data identified with stationary landmarks associated with the environment, each one of the set of behavioral models being associated with a maneuver to be performed by the AV at a corresponding geolocation of the static semantic data and the dynamic semantic data used to generate each respective one of the set of behavioral models;

transmit the query via an application programming interface (API); and in response to the transmitted query, receive data associated with at least one of the behavioral models from among the set of behavioral models having a corresponding geolocation that matches a geolocation specified by the query, and to perform, at a geolocation corresponding to the static semantic data and the dynamic semantic data used to generate the at least one of the set of behavioral models, a maneuver in accordance with the received data associated with the at least one of the set of behavioral models.

17. The non-transitory computer-readable media of claim 16, wherein the AV utilizes a driving policy for navigation in the environment, and wherein the computer-readable media further includes instructions that, when executed by one or more processors, cause the data associated with at least one of the behavioral models received by the AV to be provided as an input to a behavioral layer of the driving policy to execute the maneuver.

18. The non-transitory computer-readable media of claim 16, wherein the AV utilizes a safety driving model (SDM) that defines safety guidelines under which the AV operates within the environment, and wherein a behavioral model from among the set of behavioral models is generated using, as inputs, (i) a geolocation of the AV, (ii) a set of metrics comprising temporally sequential data associated with historic delta observations for the AV and a plurality of other AVs at the same geolocation, and (iii) an SDM label that limits output behaviors of the generated behavioral model to safe observed behaviors as defined by the SDM.

19. The non-transitory computer-readable media of claim 16, wherein the set of behavioral models are stored in a database having a graph dataset structure to provide a behavioral model graph dataset, and wherein the computer-readable media further includes instructions that, when executed by one or more processors, result in the query requesting data from the behavioral model graph dataset.

20. The non-transitory computer-readable media of claim 19, wherein the behavioral model graph dataset includes (i) a plurality of road nodes interconnected with one another per edge representation in the graph dataset, each one of the plurality of road nodes representing respective geolocations, and (ii) a plurality of behavioral nodes, each one of the plurality of behavioral nodes being connected to at least one of the plurality of road nodes, with each respective one of the behavioral nodes representing a behavioral model associated with a particular maneuver to be performed by the AV at a corresponding geolocation associated with the a respectively connected road node.

21. The non-transitory computer-readable media of claim 20, wherein the transmitted query results in an identification of the data associated with at least one of the behavioral models based upon a matching of a geolocation specified in the query to a geolocation represented by a respective one of the plurality of road nodes, and a determination of the data associated with at least one of the behavioral models in accordance with the respective behavioral nodes connected to the identified respective one of the plurality of road nodes.

22. The non-transitory computer-readable media of claim 20, wherein the query is a multi-node query for data associated with the behavioral model graph dataset, and wherein the transmitted query results in a determination of the data associated with at least one of the behavioral models based upon an ensembling process that includes at least one of bagging or boosting.

23. The computing device of claim 1, wherein the processing circuitry is configured to generate the set of behavioral models by classifying the dynamic semantic data associated with different driving maneuvers into respective road segments or map tiles.

24. The computing device of claim 1, wherein the geolocation specified by the query is from among a plurality of different region scale levels that include a road segment.

* * * * *